US008576670B2

(12) United States Patent
Akiyama

(10) Patent No.: US 8,576,670 B2
(45) Date of Patent: Nov. 5, 2013

(54) ELECTRONIC TIMEPIECE AND TIME DIFFERENCE CORRECTION METHOD FOR AN ELECTRONIC TIMEPIECE

(75) Inventor: Toshikazu Akiyama, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1346 days.

(21) Appl. No.: 12/552,644

(22) Filed: Sep. 2, 2009

(65) Prior Publication Data

US 2010/0057349 A1 Mar. 4, 2010

(30) Foreign Application Priority Data

Sep. 4, 2008 (JP) ................................ 2008-227058
Sep. 29, 2008 (JP) ................................ 2008-249943

(51) Int. Cl.
*G01S 1/00* (2006.01)
*G01C 21/00* (2006.01)

(52) U.S. Cl.
USPC ................................ 368/14; 368/21; 368/47

(58) Field of Classification Search
USPC ........................................ 368/14, 21, 46, 47
See application file for complete search history.

(56) References Cited

U.S. PATENT DOCUMENTS 5,724,316 A * 3/1998 Brunts ............................ 368/10
6,278,660 B1 * 8/2001 Tognazzini ..................... 368/21
2006/0114151 A1 6/2006 Iwami
2007/0210957 A1 9/2007 Brodie et al.
2008/0031095 A1 * 2/2008 Matsuzaki et al. .............. 368/14
2009/0135675 A1 5/2009 Akiyama
2009/0190444 A1 7/2009 Akiyama et al.
2010/0228948 A1 9/2010 Jaekwan

FOREIGN PATENT DOCUMENTS

JP 2006-138682 6/2006
JP 2010-210276 A 9/2010

* cited by examiner

*Primary Examiner* — Amy Cohen Johnson
*Assistant Examiner* — Matthew Powell

(57) ABSTRACT

An electronic timepiece has a function for receiving satellite signals transmitted from positioning information satellites for capturable positioning information based on the received satellite signal and a positioning calculation unit that generates positioning information. A time information adjustment unit corrects the internal time information based on the time difference in the assumed positioning region when the time difference evaluation unit determines that the assumed positioning does not contain a time difference boundary. The positioning calculation unit reselects the specific number of positioning information satellites and continues the positioning calculation when the time difference evaluation unit determines that the assumed positioning region contains a time difference boundary. The reception unit terminates satellite signal reception when the time difference evaluation unit determines that the assumed positioning region does not contain a time difference boundary.

9 Claims, 17 Drawing Sheets

200

200-1 200-2

| POSITION DATA | TIME DIFFERENCE DATA |
|---|---|
| VIRTUAL REGION 101 COORDINATES | LINK 1 |
| VIRTUAL REGION 102 COORDINATES | LINK 2 |
| VIRTUAL REGION 103 COORDINATES | LINK 3 |
| REGION 104 COORDINATES | + 8 |
| ... | ... |

FIG.10

202

202-1 202-2

LINK 2 →

| POSITION DATA | TIME DIFFERENCE DATA |
|---|---|
| REGION 102A COORDINATES | + 7 |
| REGION 102B COORDINATES | + 9 |
| REGION 102C COORDINATES | + 9 |
| REGION 102D COORDINATES | + 9 |
| ... | ... |
| REGION 102P COORDINATES | + 8 |

FIG.11

ELECTRONIC TIMEPIECE AND TIME DIFFERENCE CORRECTION METHOD FOR AN ELECTRONIC TIMEPIECE

CROSS-REFERENCE TO RELATED APPLICATIONS

Japanese Patent Application No (s) 2008-227058 and 2008-249943 are hereby incorporated by reference in their entirety.

BACKGROUND

1. Field of Invention

The present invention relates to an electronic timepiece and to a time difference correction method for an electronic timepiece that corrects the time difference based on satellite signals received from positioning information satellites such as GPS satellites.

2. Description of Related Art

The Global Positioning System (GPS) in which satellites (GPS satellites) orbiting Earth on known orbits transmit signals carrying superposed time information and orbit information, and terrestrial receivers (GPS receivers) receive these signals to determine the location of the receiver, is widely known. Electronic timepieces that acquire accurate time information ("GPS time") from GPS satellites and adjust the current internally kept time to the correct time have also been developed as one type of GPS receiver.

GPS time is the Coordinated Universal Time (UTC) delayed by the UTC offset (currently +14 seconds). Therefore, in order for an electronic timepiece that uses the GPS system to display the current local time, the acquired GPS time must be corrected to the current local time by adding this time difference to the UTC, and information about the time difference to UTC must be acquired.

This electronic timepiece determines its current position in order to acquire the time difference information. However, if the signal reception level is too low, the orbit information cannot be correctly demodulated and the position can therefore not be calculated. As a result, the position is generally calculated only when the signal reception level exceeds a specific threshold value. However, if the location of the GPS satellite used for the positioning calculation is poor, the positioning calculation error becomes too great and the correct position cannot be determined. As a result, the position is generally only calculated if an index denoting degradation of the precision of the positioning calculation based on the current GPS satellite location is less than a specific threshold value. Therefore, if these threshold values are fixed and the reception level is below the threshold value or the index to the positioning calculation precision is higher than the threshold value, the position will not be calculated even if the position can be calculated.

A method of increasing the precision of the positioning calculation as much as possible while also increasing the likelihood that the position will be calculated by setting these threshold values high for the initial positioning calculation and then gradually relaxing these threshold values if the positioning calculation is unsuccessful has therefore been proposed.

However, the method taught in Japanese Unexamined Patent Appl. Pub. JP-A-2006-138682 takes time for the positioning calculation to converge in order to maintain the highest possible precision in the positioning calculation. Because power consumption increases as the time required by the positioning calculation increases, applying this method in electronic timepieces such as battery-powered wristwatches is difficult.

SUMMARY OF INVENTION

An electronic timepiece according to a first aspect of the invention is an electronic timepiece having a function for receiving satellite signals transmitted from positioning information satellites, the electronic timepiece including a reception unit that receives the satellite signal and acquires satellite information from the received satellite signal, a satellite search unit that executes a process of searching for a capturable positioning information satellite based on the received satellite signal and capturing the found satellite signal, a positioning calculation unit that selects a specific number of positioning information satellites from among the positioning information satellites captured by the satellite search unit, executes a positioning calculation based on the satellite information contained in the satellite signals sent from the selected positioning information satellites, and generates positioning information, a time information adjustment unit that corrects internal time information based on the satellite information, a time information display unit that displays the internal time information, a storage unit that stores time difference information defining the time difference in each of a plurality of areas into which geographical information is divided, and a time difference evaluation unit that calculates an assumed positioning region based on the positioning information, and determines based on the time difference information if the assumed positioning region contains a time difference boundary. The time information adjustment unit correcting the internal time information based on the time difference in the assumed positioning region when the time difference evaluation unit determines that the assumed positioning region does not contain a time difference boundary, The positioning calculation unit reselecting the specific number of positioning information satellites and continuing the positioning calculation when the time difference evaluation unit determines that the assumed positioning region contains a time difference boundary. The reception unit terminating satellite signal reception when the time difference evaluation unit determines that the assumed positioning region does not contain a time difference boundary.

A time difference adjustment method for an electronic timepiece according to a second aspect of the invention is a time difference adjustment method for an electronic timepiece including a reception unit that receives satellite signals transmitted from positioning information satellites and acquires satellite information from the received satellite signal, a time information display unit that displays internal time information, and a storage unit that stores time difference information defining the time difference in each of a plurality of areas into which geographical information is divided. The time difference adjustment method has a step of acquiring the satellite information by means of the reception unit, a satellite search step of searching for a capturable positioning information satellite based on the received satellite signal and capturing the found satellite signal; a positioning calculation step of selecting a specific number of positioning information satellites from among the positioning information satellites captured by the satellite search step, executing a positioning calculation based on the satellite information contained in the satellite signals sent from the selected positioning information satellites, and generating positioning information; a step of calculating an assumed positioning region based on the positioning information; a time difference evaluation step of determining based on the time difference information if the assumed positioning region contains a time difference boundary; and a step of correcting the internal time information based on the time difference in the assumed positioning region and terminating satellite signal reception by the reception unit when the assumed positioning region is determined to not include a time difference boundary. The positioning calculation step selects the specific number of positioning information satellites again and continues the positioning calculation when the assumed positioning region is determined to contain a time difference boundary.

BRIEF DESCRIPTION OF THE DRAWINGS

FIG. 10 shows an example of time difference information in a second embodiment of the invention.

FIG. 11 shows an example of time difference information in a second embodiment of the invention.

DESCRIPTION OF THE PREFERRED EMBODIMENTS

Figure 1:
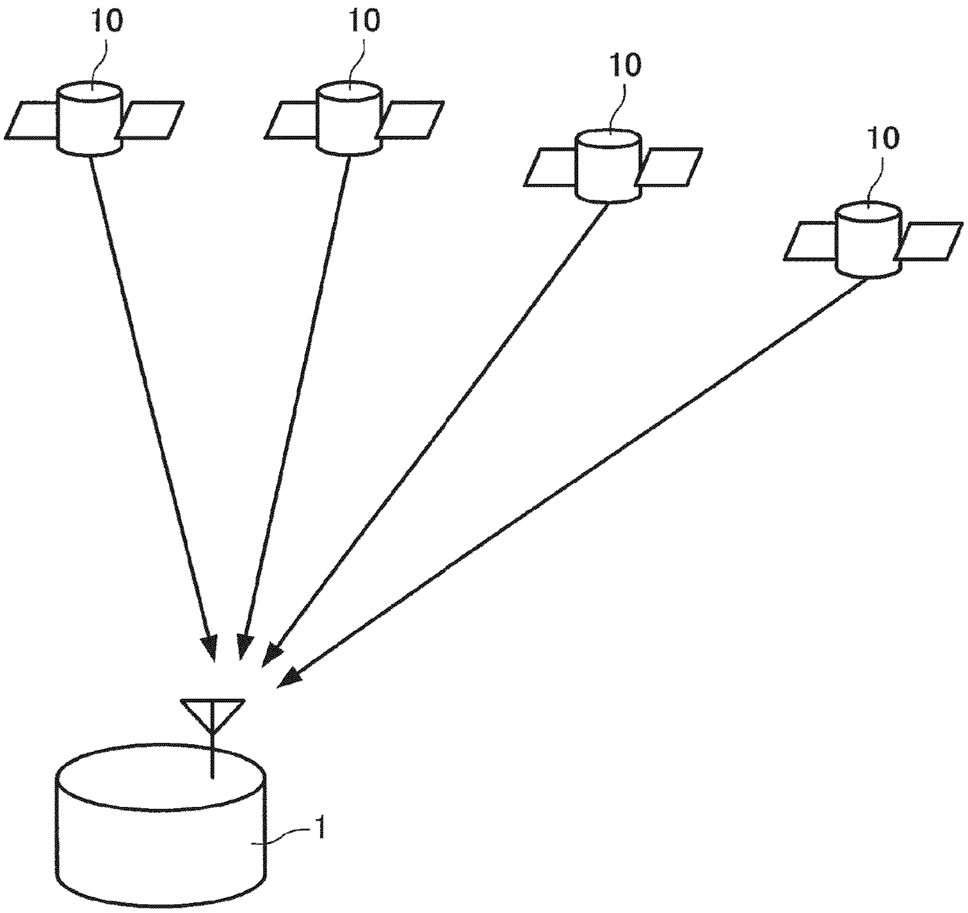
FIG. 1 schematically describes the GPS system.

An electronic timepiece and a time difference adjustment process for an electronic timepiece according to the present invention optimize power consumption and adjust the time difference based on a satellite signal from a positioning information satellite using the least required power consumption.

(1) An electronic timepiece according to a first aspect of the invention is an electronic timepiece having a function for receiving satellite signals transmitted from positioning information satellites, the electronic timepiece including a reception unit that receives the satellite signal and acquires satellite information from the received satellite signal, a satellite search unit that executes a process of searching for a capturable positioning information satellite based on the received satellite signal and capturing the found satellite signal, a positioning calculation unit that selects a specific number of positioning information satellites from among the positioning information satellites captured by the satellite search unit, executes a positioning calculation based on the satellite information contained in the satellite signals sent from the selected positioning information satellites, and generates positioning information, a time information adjustment unit that corrects internal time information based on the satellite information, a time information display unit that displays the internal time information, a storage unit that stores time difference information defining the time difference in each of a plurality of areas into which geographical information is divided, and a time difference evaluation unit that calculates an assumed positioning region based on the positioning information, and determines based on the time difference information if the assumed positioning region contains a time difference boundary. The time information adjustment unit correcting the internal time information based on the time difference in the assumed positioning region when the time difference evaluation unit determines that the assumed positioning region does not contain a time difference boundary, The positioning calculation unit reselecting the specific number of positioning information satellites and continuing the positioning calculation when the time difference evaluation unit determines that the assumed positioning region contains a time difference boundary. The reception unit terminating satellite signal reception when the time difference evaluation unit determines that the assumed positioning region does not contain a time difference boundary.

The satellite information includes time information and orbit information for the positioning information satellite that is transmitted by the positioning information satellite.

The internal time information is information about the time kept internally by the electronic timepiece.

The assumed positioning region is a region in which the electronic timepiece is possibly located. For example, the assumed positioning region may be the area inside a circle of which the positioning calculation error is the radius and the center is the location indicated by the positioning information of the electronic timepiece (such as longitude and latitude) acquired by the positioning calculation.

If the calculated assumed positioning region does not contain a time difference boundary in the electronic timepiece according to the invention, the electronic timepiece is assured of being somewhere in the area with the same time difference. As a result, the standard for determining whether to end the time adjustment process (time difference adjustment process) can be whether or not the assumed positioning region contains a time difference boundary and not the precision of the positioning calculation.

For example, even if the assumed positioning region that is calculated is quite large (for example, the inside area of a circle with a radius of several hundred kilometers) because the precision of the positioning calculation is low, the time difference can be acquired and the time can be corrected if all of the assumed positioning region is within an extremely large single time zone area, such as China or over the ocean.

More specifically, even if the exact position cannot be determined because the precision of the positioning calculation is low, an electronic timepiece according to the invention can end the reception process and adjust the time depending upon the position of the electronic timepiece. The electronic timepiece according to the invention can therefore optimize the power consumption required for the positioning calculation and can finish adjusting the time (adjusting the time difference) with as little power consumption as possible.

When the assumed positioning region that is calculated contains a time difference boundary, the electronic timepiece according to the invention reselects the positioning information satellites and continues the positioning calculation. Because the precision of the positioning calculation can thus be improved, a small assumed positioning region not containing a time difference boundary can be easily calculated. The electronic timepiece can therefore easily identify the time difference even if located relatively near a time difference boundary, can optimize the power consumption required for the positioning calculation, and can finish adjusting the time (adjusting the time difference) with as little power consumption as possible.

(2) In an electronic timepiece according to another aspect of the invention, the satellite search unit continues a process searching for new capturable positioning information satellites until positioning information satellites equal to a maximum number of capturable satellites are captured, and executes a process of stopping the capture of at least one positioning information satellite and searching for a new capturable positioning information satellite when the maximum capturable number of positioning information satellites is captured and the time difference evaluation unit determines the assumed positioning region contains a time difference boundary.

Capturing a positioning information satellite may be stopped when the assumed positioning region is determined to include a time difference boundary as a result of calculating the position using at least combination of positioning information satellites.

In addition, when the positioning calculation is done using all satellite combinations and the assumed positioning regions that are calculated based on all of the calculations are determined to include a time difference boundary, capturing at least one positioning information satellite may be stopped.

In other words, when the time difference evaluation unit determines that the assumed positioning region does not contain a time difference boundary, the positioning calculation unit preferably performs the positioning calculation based on all positioning information satellite combinations, and when the time difference evaluation unit determines that the assumed positioning region contains a time difference boundary based on the results of all positioning calculations, the satellite search unit preferably executes a process to stop the capture of at least one positioning information satellite and search for a new positioning information satellite that can be captured. The positioning information satellite for which capturing is stopped is preferably the positioning information satellite that most degrades the positioning precision of the positioning calculation.

When the maximum number of capturable positioning information satellites are captured and the calculated assumed positioning region contains a time difference boundary, the electronic timepiece according to this aspect of the invention runs the positioning calculation using satellite information for a positioning information satellite newly captured as a substitute for at least one positioning information satellite. Because the precision of the positioning calculation can thus be improved, a small assumed positioning region not containing a time difference boundary can be easily calculated. The electronic timepiece can therefore easily identify the time difference even if located relatively near a time difference boundary, can optimize the power consumption required for the positioning calculation, and can finish adjusting the time (adjusting the time difference) with as little power consumption as possible.

(3) In an electronic timepiece according to another aspect of the invention the reception unit ends satellite signal reception when the time difference evaluation unit does not determine that the assumed positioning region does not contain a time difference boundary before a specified time limit passes.

(4) In an electronic timepiece according to another aspect of the invention the positioning calculation unit calculates the positioning information error based on a DOP value, and the time difference evaluation unit calculates the assumed positioning region based on said error.

For example, the positioning error may be calculated by multiplying a DOP value with the error in the distance between the positioning information satellite and the electronic timepiece computed by the positioning calculation, and the assumed positioning region may be the area inside a circle of which the center is the position identified by the positioning information and the radius is the positioning calculation error.

(5) Further preferably, the electronic timepiece also has a positioning information display unit that displays the positioning information, and updates the displayed positioning information when the time difference evaluation unit determines that the assumed positioning region does not contain a time difference boundary.

(6) In an electronic timepiece according to another aspect of the invention, the time difference information includes information identifying the position of a virtual region containing a plurality of areas defined with different time differences selected from the plurality of areas into which the geographical information is divided, and the time difference evaluation unit determines based on the time difference information if the assumed positioning region contains at least a part of the virtual region, and determines whether or not the assumed positioning region contains a time difference boundary based on the position of the area contained in the virtual region when the assumed positioning region contains the virtual region.

This aspect of the invention determines if the calculated assumed positioning region contains all or part of a virtual region, and if it does, references the position of an area inside the virtual region to determine if there is a time difference boundary. Therefore, if a region containing a dense grouping of multiple small time zones is defined as the virtual region, and the calculated assumed positioning region does not contain the virtual region, it is not necessary to separately determine if the assumed positioning region contains all or a part of these multiple small time zone regions. This aspect the invention can therefore optimize the time of the evaluation process that determines if the assumed positioning region contains a time difference boundary.

Furthermore, this aspect of the invention determines whether or not the assumed positioning region contains a time difference boundary based on the positions of the multiple areas contained in the virtual region when the assumed positioning region that is calculated contains a virtual region, high evaluation precision can be assured.

(7) In the electronic timepiece according to another aspect of the invention, the areas are grouped into first-level to N-level (where N≥2) areas; the time difference information includes first-level to N-level time difference information defining the time difference in each of the first-level to N-level areas; the virtual region in the k-level (where 1≤k<N) time difference information includes areas of levels k+1 and less; and the time difference evaluation unit determines based on the k level time difference information whether or not the assumed positioning region contains at least a part of the virtual region, and when the assumed positioning region contains at least a part of the virtual region, determines based on the k+1 level time difference information whether or not the assumed positioning region contains at least a part of the virtual region.

This aspect of the invention first references the first-level time difference information to determine if the assumed positioning region contains all or part of a first-level virtual region (a virtual region for which the information used to identify its position is defined in first-level time difference information). If the assumed positioning region contains all or part of a first-level virtual region, second-level time difference information is referenced next to determine if the assumed positioning region contains a second-level virtual region (a virtual region for which the information used to identify its position is defined in second-level time difference information). Likewise, if the assumed positioning region contains all or part of a k-level virtual region, k+1 level time difference information is referenced next to determine if the assumed positioning region contains a k+1 level virtual region (a virtual region for which the information used to identify its position is defined in k+1 level time difference information). If the assumed positioning region does not contain all or part of a k-level virtual region, whether or not the assumed positioning region contains a time difference boundary is determined based on the position of an area for which a k-level time difference is defined.

In other words, because this aspect of the invention executes the evaluation process while sequentially referencing time difference information suitably organized hierarchically according to the size of the region for which a time difference is defined, how much time is consumed by the evaluation process can be optimized.

(8) In an electronic timepiece according to another aspect of the invention the areas and the virtual region are drawn with a rectangular shape.

Because the shape of the areas for which a time difference is defined and the virtual regions is rectangular, this aspect of the invention only needs to store coordinate data for the two end points of the diagonals of the rectangles in order to determine the area. As a result, this aspect of the invention can greatly reduce the amount of time difference information that must be stored compared with a configuration that stores data for each of numerous short lines used to define a time difference boundary.

Yet further, if the size of the rectangular shapes of the time difference definition areas and virtual regions contained in the time difference information for each level is fixed, this aspect of the invention needs to store the coordinates of only one point for each area or region, and can thus further reduce the amount of time difference data.

In addition, because the time difference definition areas and virtual regions are rectangular, this aspect of the invention can very easily determine if the calculated assumed positioning region contains a time difference boundary.

(9) Another aspect of the invention is a time difference adjustment method for an electronic timepiece according to a second aspect of the invention is a time difference adjustment method for an electronic timepiece including a reception unit that receives satellite signals transmitted from positioning information satellites and acquires satellite information from the received satellite signal, a time information display unit that displays internal time information, and a storage unit that stores time difference information defining the time difference in each of a plurality of areas into which geographical information is divided. The time difference adjustment method has a step of acquiring the satellite information by means of the reception unit, a satellite search step of searching for a capturable positioning information satellite based on the received satellite signal and capturing the found satellite signal; a positioning calculation step of selecting a specific number of positioning information satellites from among the positioning information satellites captured by the satellite search step, executing a positioning calculation based on the satellite information contained in the satellite signals sent from the selected positioning information satellites, and generating positioning information; a step of calculating an assumed positioning region based on the positioning information; a time difference evaluation step of determining based on the time difference information if the assumed positioning region contains a time difference boundary; and a step of correcting the internal time information based on the time difference in the assumed positioning region and terminating satellite signal reception by the reception unit when the assumed positioning region is determined to not include a time difference boundary. The positioning calculation step selects the specific number of positioning information satellites again and continues the positioning calculation when the assumed positioning region is determined to contain a time difference boundary.

Preferred embodiments of the present invention are described below with reference to the accompanying figures. Note that the embodiments described below do not unduly limit the scope of the invention described in the accompanying claims. In addition, the invention does not necessary require all aspects of the configurations described below.

1. GPS System

1-1 Summary

FIG. 1 schematically describes a GPS system.

GPS satellites 10 orbit the Earth on specific known orbits and transmit navigation messages superposed to a 1.57542 GHz carrier (L1 signal) to Earth. Note that a GPS satellite 10 is an example of a positioning information satellite in a preferred embodiment of the invention, and the 1.57542 GHz carrier signal with a superposed navigation message (referred to below as the "satellite signal") is an example of a satellite signal in a preferred embodiment of the invention.

There are currently approximately 30 GPS satellites 10 in orbit, and in order to identify the GPS satellite 10 from which a satellite signal was transmitted, each GPS satellite 10 superposes a unique 1023 chip (1 ms period) pattern called a Coarse/Acquisition Code (CA code) to the satellite signal. The C/A code is an apparently random pattern in which each chip is either +1 or −1. The C/A code superposed to the satellite signal can therefore be detected by correlating the satellite signal with the pattern of each C/A code.

Each GPS satellite 10 has an atomic clock on board, and the satellite signal carries the extremely accurate time information (called the "GPS time information" below) kept by the atomic clock. The miniscule time difference of the atomic clock on board each GPS satellite 10 is measured by a terrestrial control segment, and a time correction parameter for correcting the time difference is also contained in the satellite signal. A GPS receiver 1 can therefore receive the satellite signal transmitted from one GPS satellite 10 and adjust the internally kept time to the correct time by using the GPS time information and time correction parameter contained in the received signal.

Orbit information describing the location of the GPS satellite 10 on its orbit is also contained in the satellite signal. The GPS receiver 1 can perform a positioning calculation using the GPS time information and the orbit information. This positioning calculation assumes that there is a certain amount of error in the internal time kept by the GPS receiver 1. More specifically, in addition to the x, y, and z parameters for identifying the three-dimensional position of the GPS receiver 1, the time difference is also an unknown value. As a result, a GPS receiver 1 generally receives satellite signals transmitted from four or more GPS satellites, and performs the positioning calculation using the GPS time information and orbit information contained in the received signals.

The precision of the positioning calculation differs according to the geometric positions of the GPS satellite 10 and the GPS receiver 1. A DOP (dilution of precision) value representing the degree of precision loss in the positioning calculation resulting from the location of the GPS satellite 10 is therefore generally used. The precision of the positioning calculation is evaluated by multiplying the rangefinding precision (the precision measuring the distance between the GPS satellite 10 and the GPS receiver 1) by a DOP value, and a lower DOP value represents higher precision in the positional measurement. Note that DOP can be expressed by a number of separate measurements, including GDOP (Geometric DOP) as a general indicator of the precision of the determined position and time; PDOP (Positional DOP) as an index to the precision of the determined position, HDOP (Horizontal DOP) as an index to the precision of the determined horizontal position, VDOP (Vertical DOP) as an index to the precision of the determined vertical position, and TDOP (Time DOP) as an index to the precision of the determined time.

1-2 Navigation Message

Figure 2A:
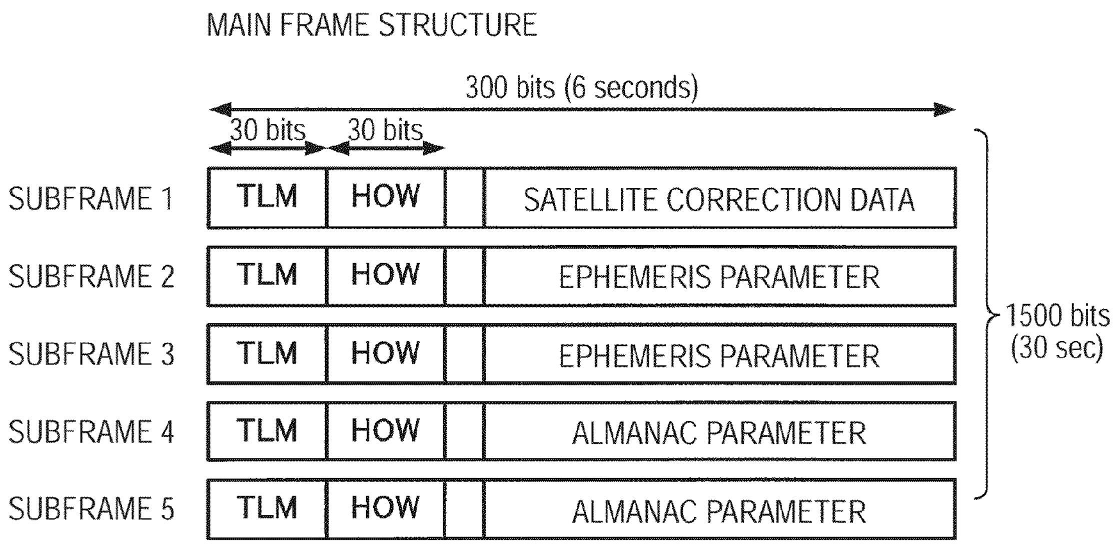
FIG. 2A to FIG. 2C describe the structure of a navigation message.
Figure 2B:
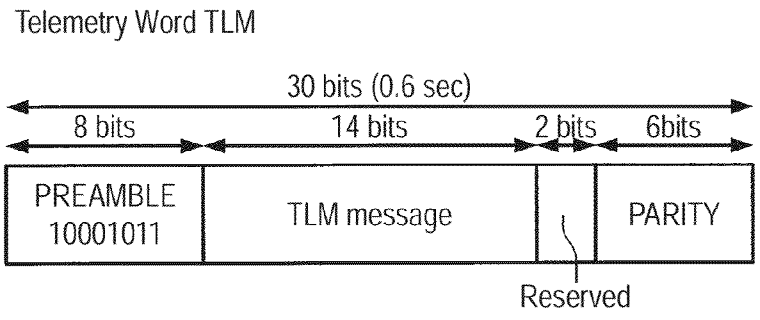
Figure 2C:
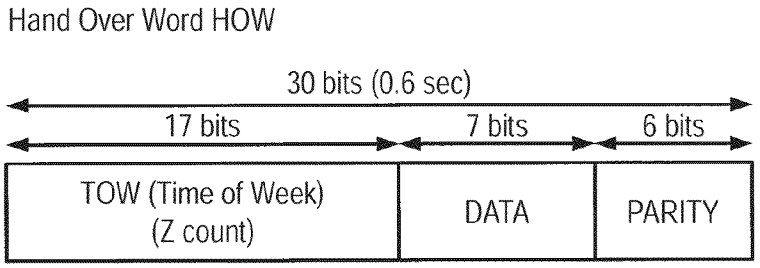

FIG. 2A to FIG. 2C describe the structure of the navigation message.

As shown in FIG. 2A, the navigation message is composed of data organized in a single main frame containing a total 1500 bits. The main frame is divided into five subframes of 300 bits each. The data in one subframe is transmitted in 6 seconds from each GPS satellite 10. It therefore requires 30 seconds to transmit the data in one main frame from each GPS satellite 10.

Subframe 1 contains satellite correction data such as the week number. The week number identifies the week to which the current GPS time information belongs. The GPS time starts at 00:00:00 on Jan. 6, 1980, and the number of the week that started that day is week number 0. The week number is updated every week.

Subframes 2 and 3 contain ephemeris data, that is, detailed orbit information for each GPS satellite 10. Subframes 4 and 5 contain almanac data (general orbit information for all GPS satellites 10 in the constellation).

Each of subframes 1 to 5 starts with a telemetry (TLM) word containing 30 bits of telemetry (TLM) data, followed by a HOW word containing 30 bits of HOW (handover word) data.

Therefore, while the TLM words and HOW words are transmitted at 6-second intervals from the GPS satellite 10, the week number data and other satellite correction data, ephemeris data, and almanac data are transmitted at 30-second intervals.

As shown in FIG. 2B, the TLM word contains preamble data, a TLM message, reserved bits, and parity data.

As shown in FIG. 2C, the HOW word contains time information called the TOW or Time of Week (also called the Z count). The Z count denotes in seconds the time passed since 00:00 of Sunday each week, and is reset to 0 at 00:00 of Sunday each week. More specifically, the Z count denotes the time passed from the beginning of each week in seconds, and the elapsed time is a value expressed in units of 1.5 seconds. Note, further, that the Z count denotes the time that the first bit of the next subframe data was transmitted. For example, the Z count transmitted in subframe 1 denotes the time that the first bit in subframe 2 is transmitted.

The HOW word also contains 3 bits of data denoting the subframe ID (also called the ID code). More specifically, the HOW words of subframes 1 to 5 shown in FIG. 2A contain the ID codes 001, 010, 011, 100, and 101, respectively.

The GPS receiver 1 can get the GPS time information by acquiring the week number value contained in subframe 1 and the HOW words (Z count data) contained in subframes 1 to 5. However, if the GPS receiver 1 has previously acquired the week number and internally counts the time passed from when the week number value was acquired, the current week number value of the GPS satellite can be obtained without acquiring the week number from the satellite signal. The GPS receiver 1 can therefore estimate the current GPS time information if the Z count is acquired. The GPS receiver 1 therefore normally acquires only the Z count as the time information.

Note that the TLM word, HOW word (Z count), satellite correction data, ephemeris, and almanac parameters are examples of satellite information in the invention.

The GPS receiver 1 may be rendered as a wristwatch with a GPS device (referred to herein as a GPS wristwatch). A GPS wristwatch is an example of an electronic timepiece according to one embodiment of the present invention, and a GPS wristwatch according to this embodiment of the invention is described next.

2. GPS Wristwatch

2-1 Embodiment 1

Configuration of a GPS Wristwatch

Figure 3B:
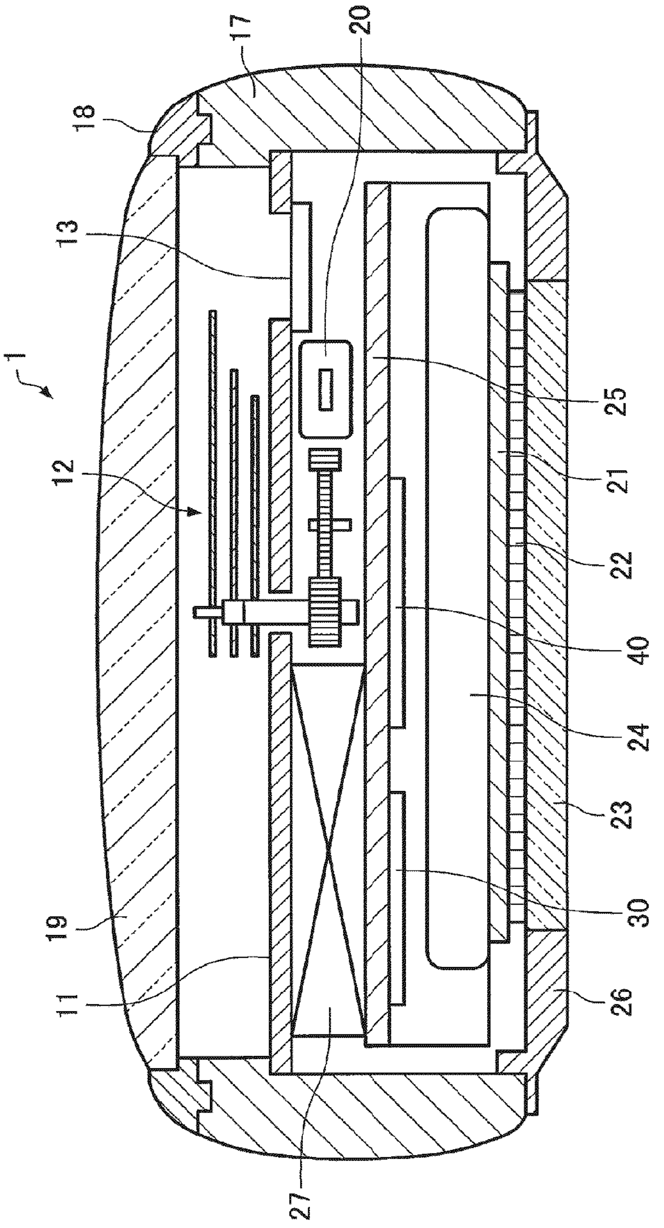
FIG. 3A and FIG. 3B describe the configuration of a GPS wristwatch according to a first embodiment of the invention.
Figure 3A:
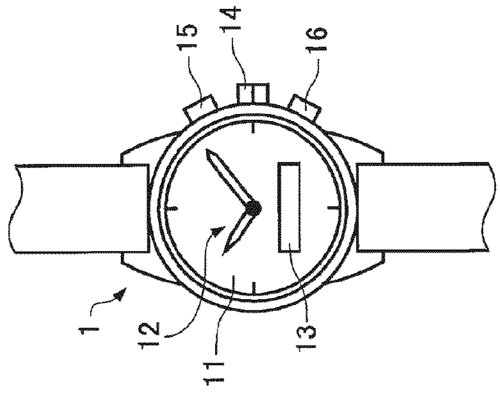

FIG. 3A and FIG. 3B are figures describing the configuration of a GPS wristwatch according to a preferred embodiment of the invention. FIG. 3A is a schematic plan view of a GPS wristwatch, and FIG. 3B is a schematic section view of the GPS wristwatch in FIG. 3A.

As shown in FIG. 3A, the GPS wristwatch 1 has a dial 11 and hands 12. A display 13 is disposed in a window formed in a part of the dial 11. The display 13 may be an LCD (liquid crystal display) panel, and is used to display information such as the current latitude and longitude or the name of a city in the current time zone or location, or other message information. The hands 12 include a second hand, minute hand, and hour hand, and are driven through a wheel train by means of a stepping motor.

The dial 11 and hands 12 function as a time information display unit in the invention in a preferred embodiment of the invention. The display 13 functions as a positioning information display unit in a preferred embodiment of the invention.

By manually operating the crown 14 or buttons 15 and 16, the GPS wristwatch 1 can be set to a mode (referred to below as the "time mode") for receiving a satellite signal from at least one GPS satellite 10 and adjusting the internal time information, or a mode (referred to below as the "positioning mode") for receiving satellite signals from a plurality of GPS satellites 10, calculating the position, and correcting the time difference of the internal time information. The GPS wristwatch 1 can also regularly (automatically) execute the time mode or positioning mode.

As shown in FIG. 3B, the GPS wristwatch 1 has an outside case 17 that is made of stainless steel, titanium, or other metal.

The outside case 17 is basically cylindrically shaped, and a crystal 19 is attached to the opening on the face side of the outside case 17 by an intervening bezel 18. A back cover 26 is attached to the opening on the back side of the outside case 17. The back cover 26 is annular and made of metal, and a back glass unit 23 is attached to the opening in the center.

Inside the outside case 17 are disposed a stepping motor for driving the hands 12, a GPS antenna 27, and a battery 24.

The stepping motor has a motor coil 19, a stator and a rotor, and drives the hands 12 by means of an intervening wheel train.

The GPS antenna GPS antenna 27 is an antenna for receiving satellite signals from a plurality of GPS satellites 10, and may be a patch antenna, helical antenna, or chip antenna, for example. The GPS antenna 27 is located on the opposite side of the dial 11 as the side on which the time is displayed (that is, on the back cover side), and receives RF signals through the crystal 19 and the dial 11.

The dial 11 and crystal 19 are therefore made from a material, such as plastic, that passes RF signals in the 1.5 GHz band. To improve satellite signal reception performance, the bezel 18 is made from ceramic or other material.

A circuit board 25 is disposed on the back cover side of the GPS antenna 27, and a battery 24 is disposed on the back cover side of the circuit board 25.

Disposed to the circuit board 25 are a reception chip 18 including a reception circuit that processes satellite signals received by the GPS antenna 27, and a control chip 40 that controls, for example, driving the stepping motor. The reception chip 30 and control chip 40 are driven by power supplied from the battery 24.

The battery 24 is a lithium-ion battery or other type of rechargeable storage battery. A magnetic sheet 21 is disposed below (on the back cover side of) the battery 24. A charging coil 22 is disposed with the magnetic sheet 21 between it and the battery 24, and the battery 24 can be charged by the charging coil 22 by means of electromagnetic induction from an external charger.

The magnetic sheet 21 can also divert the magnetic field. The magnetic sheet 21 therefore reduces the effect of the battery 24 and enables the efficient transmission of energy. A back glass unit 23 is disposed in the center part of the back cover 26 to facilitate power transmission.

A lithium-ion battery or other storage battery is used as the battery 24 in this embodiment of the invention, but a lithium battery or other primary battery may be used instead. The charging method used when a storage battery is used is also not limited to charging by electromagnetic induction from an external charger through a charging coil 22. For example, a solar cell may be disposed to the GPS wristwatch 1 to generate electricity for charging the battery.

GPS Wristwatch Circuit Configuration

Figure 4:
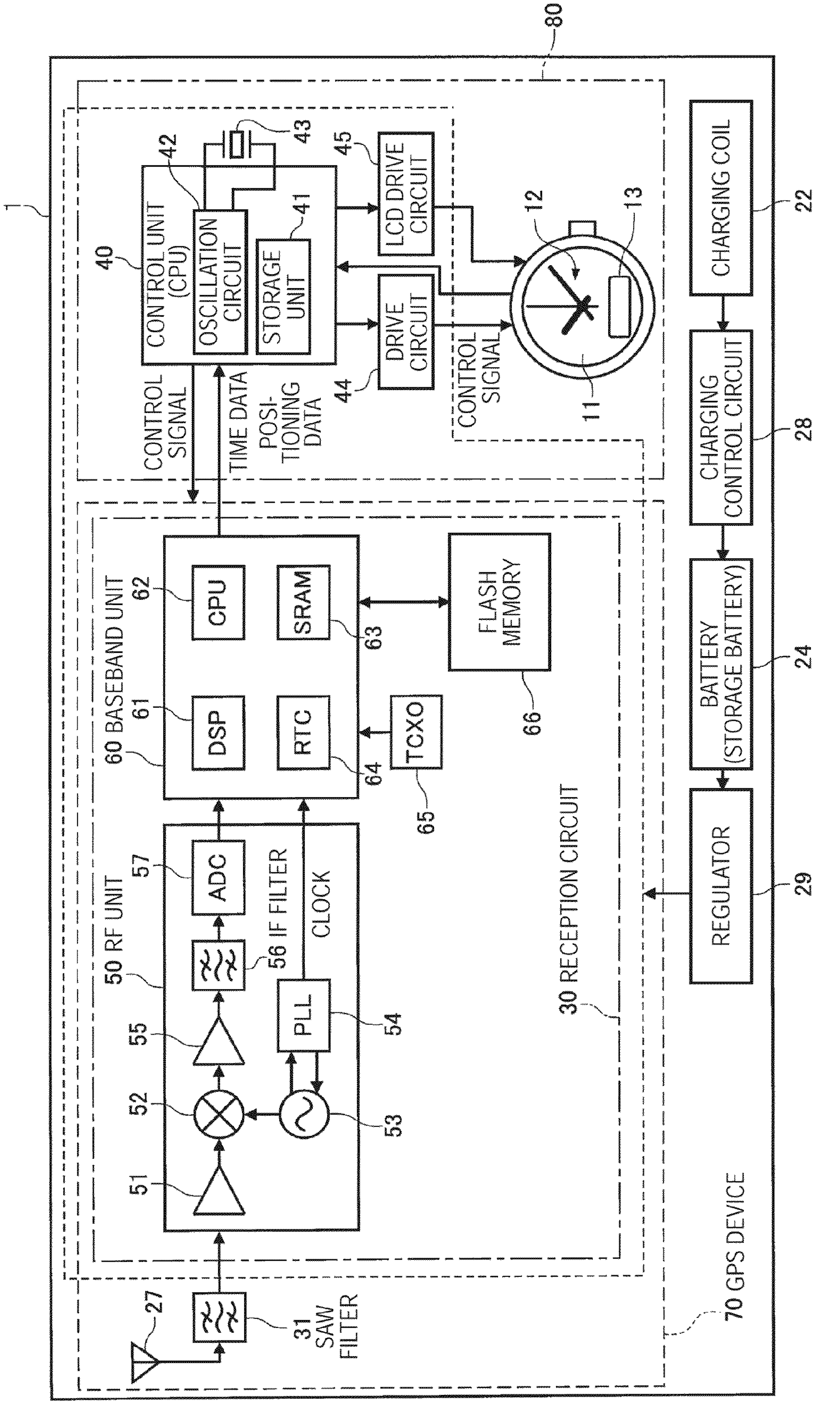
FIG. 4 describes the circuit configuration of a GPS wristwatch according to the first embodiment of the invention.

FIG. 4 describes the circuit configuration of a GPs wristwatch according to this embodiment of the invention.

The GPS wristwatch 1 includes a GPS device 70 and a time display device 80.

The GPS device 70 includes the reception unit, satellite search unit, positioning calculation unit, time difference evaluation unit, and storage unit in a preferred embodiment of the invention, and executes the processes for receiving a satellite signal and acquiring satellite information, finding and capturing a GPS satellite 10, calculating the position, calculating the assumed positioning region and determining time difference boundaries, and storing time difference information.

The time display device 80 includes the time information adjustment unit and time information display unit in a preferred embodiment of the invention, and executes the processes for adjusting the internal time information and displaying the internal time information.

The charging coil 22 charges the battery 24 with electricity through the charging control circuit 28. The battery 24 supplies drive power through the regulator 29 to the GPS device 70 and time display device 80.

GPS Device Configuration

The GPS device 70 has a GPS antenna 27 and a SAW (surface acoustic wave) filter 31. As described in FIG. 3B, the GPS antenna 27 is an antenna for receiving satellite signals from a plurality of GPS satellites 10. However, because the GPS antenna 27 also receives some extraneous signals other than satellite signals, the SAW filter 31 executes a process that extracts a satellite signal from the signal received by the GPS antenna 27. More particularly, the SAW filter 31 is rendered as a bandpass filter that passes signals in the 1.5 GHz band.

The GPS device 70 includes a reception chip (reception circuit) 30. The reception circuit 30 includes an RF (radio frequency) unit 50 and a baseband unit 60. As described below, the reception circuit 30 executes a process that acquires satellite information including orbit information and GPS time information contained in the navigation message from the 1.5 GHz satellite signal extracted by the SAW filter 31.

The RF unit 50 includes a low noise amplifier (LNA) 51, a mixer 52, a VCO (voltage controlled oscillator) 53, a PLL (phase locked loop) circuit 54, an IF (intermediate frequency) amplifier 55, and IF filter 56, and an A/D converter 57.

The satellite signal extracted by the SAW filter 31 is amplified by the LNA 51. The satellite signal amplified by the LNA 51 is mixed by the mixer 52 with a clock signal output from the VCO 53, and is down-converted to a signal in the intermediate frequency band. The PLL circuit 54 phase compares a reference clock signal and a clock signal obtained by frequency dividing the output clock signal of the VCO 53, and synchronizes the output clock signal of the VCO 53 to the reference clock signal. As a result, the VCO 53 can output a stable clock signal with the frequency precision of the reference clock signal. Note that a frequency of several megahertz can be selected as the intermediate frequency.

The signal mixed by the mixer 52 is then amplified by the IF amplifier 55. This mixing step of the mixer 52 generates a signal in the IF band and a high frequency signal of several gigahertz. As a result, the IF amplifier 55 amplifies the IF band signal and the high frequency signal of several gigahertz. The IF filter 56 passes the IF band signal and removes this high frequency signal of several gigahertz (or more particularly attenuates the signal to a specific level or less). The IF band signal passed by the IF filter 56 is then converted to a digital signal by the A/D converter 57.

The baseband unit 60 includes a DSP (digital signal processor) 61, CPU (central processing unit) 62, SRAM (static random access memory) 63, and RTC (real-time clock) 64. A TXCO (temperature-compensated crystal oscillator) 65 and flash memory 66 are also connected to baseband unit 60.

The TXCO 65 generates a reference clock signal of a substantially constant frequency irrespective of temperature.

Time difference information is stored in the flash memory 66. This time difference information is information that divides geographical information into a plurality of regions and defines the time difference for each region. The flash memory 66 thus functions as a storage unit in a preferred embodiment of the invention.

When the time mode or positioning mode is set, the baseband unit 60 demodulates the baseband signal from the digital signal (IF band signal) output by the A/D converter 57 of the RF unit 50.

In addition, when the time mode or positioning mode is set, the baseband unit 60 executes a process to generate a local code of the same pattern as each C/A code, and correlate the local code with the C/A code contained in the baseband signal, in the satellite search process described below. The baseband unit 60 also adjusts the output timing of the local code to achieve the peak correlation value to each local code, and when the correlation value equals or exceeds a threshold value, determines successful synchronization with the GPS satellite 10 matching that local code (that is, determines that the GPS satellite 10 was captured). The baseband unit 60 (CPU 62) thus functions as the satellite search unit in a preferred embodiment of the invention. Note that the GPS system uses a CDMA (code division multiple access) system enabling all GPS satellites 10 to transmit satellite signals at the same frequency using different C/A codes. Therefore, a GPS satellite 10 that can be captured can be found by evaluating the C/A code contained in the received satellite signal.

In order to acquire the satellite information from the captured GPS satellite 10 in the time mode and positioning mode, the baseband unit 60 executes a process to mix the local code having the same pattern as the C/A code of the GPS satellite 10 with the baseband signal. A navigation message containing the satellite information of the captured GPS satellite 10 is demodulated in the mixed signal. In the time mode or positioning mode, the baseband unit 60 then executes a process of detecting the TLM word in each subframe of the navigation message (the preamble data), and acquiring (and storing in SRAM 63, for example) the satellite information including the orbit information and GPS time information contained in each subframe.

When the positioning mode is set, the baseband unit 60 calculates the position based on the GPS time information and orbit information, and acquires positioning information (more specifically, the longitude and latitude of the place where the GPS wristwatch 1 is located during reception) and positioning error (more specifically, the maximum distance between the place where the GPS wristwatch 1 is actually located and the location identified by the positioning information). The baseband unit 60 thus functions as the positioning calculation unit in a preferred embodiment of the invention.

In addition, when the positioning mode is set, the baseband unit 60 executes a process of calculating the region where the GPS wristwatch 1 could be positioned (the assumed positioning region) based on the positioning information and positioning error obtained in the positioning calculation. The baseband unit 60 then references the time difference information stored in flash memory 66, and determines if the assumed positioning region includes a time difference boundary. If the baseband unit 60 determines that the assumed positioning region does not contain a time difference boundary, it acquires the time difference data for the assumed positioning region from the time difference information stored in flash memory 66. More specifically, the baseband unit 60 functions as a time difference evaluation unit in a preferred embodiment of the invention.

Note that operation of the baseband unit 60 is synchronized to the reference clock signal output by the TXCO 65. The RTC 64 generates the timing for processing the satellite signal. The RTC 64 counts up at the reference clock signal output from the TXCO 65.

Note that the GPS device 70 functions as the reception unit in a preferred embodiment of the invention.

Time Display Device Configuration

The time display device 80 includes a control chip 40 (control unit), a drive circuit 44, an LCD drive circuit 45, and a crystal oscillator 43.

The control unit 40 includes a storage unit 41 and oscillation circuit 42 and controls various operations.

The control unit 40 controls the GPS device 70. More specifically, the control unit 40 sends a control signal to the reception circuit 30 and controls the reception operation of the GPS device 70.

The control unit 40 also controls driving the hands 12 through the drive circuit 44. The control unit 40 also controls driving the display 13 through the LCD drive circuit 45. For example, in the positioning mode the control unit 40 controls the display 13 to display the current position.

The internal time information is stored in the storage unit 41. The internal time information is information about the time kept internally by the GPS wristwatch 1. This internal time information is updated by the reference clock signal generated by the crystal oscillator 43 and oscillation circuit 42. The internal time information can therefore be updated and moving the hands 12 can continue even when power supply to the reception circuit 30 has stopped.

When the time mode is set, the control unit 40 controls operation of the GPS device 70, corrects the internal time information based on the GPS time information and saves the corrected time in the storage unit 41. More specifically, the internal time information is adjusted to the UTC (Coordinated Universal Time), which is acquired by adding the UTC offset (the current time+14 seconds) to the acquired GPS time information.

When the positioning mode is set, the control unit 40 controls operation of the GPS device 70, corrects the time difference of the internal time information based on the GPS time information and the time difference data, and stores the corrected time in the storage unit 41. The control unit 40 thus functions as a time information adjustment unit in a preferred embodiment of the invention.

The time difference adjustment process (positioning mode) in this first embodiment of the invention are described next.

Figure 5:
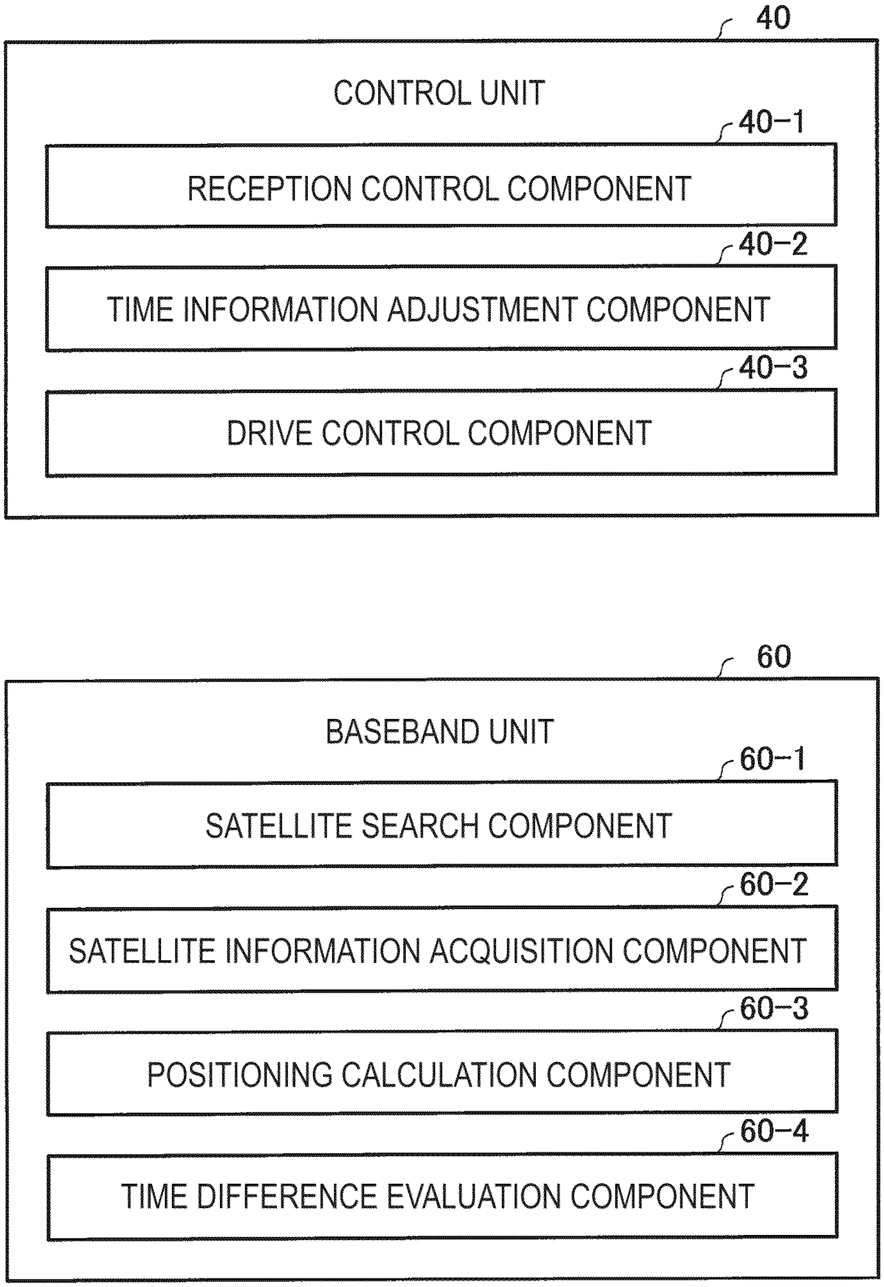
FIG. 5 describes the configuration of the control unit and the baseband unit in a preferred embodiment of the invention.

Note that the control unit 40 and baseband unit 60 can be rendered as dedicated circuits for controlling these processes, or a CPU incorporated in the GPS wristwatch 1 can function as a computer by executing a control program stored in the storage unit 41 and SRAM 63, for example, and control these processes. The control program can be installed through a communication network such as the Internet or from a recording medium such as CD-ROM or a memory card. Yet more specifically, as shown in FIG. 5, the time difference adjustment process can be executed by the control unit 40 functioning as a reception control component 40-1, time information adjustment component 40-2, and drive control component 40-3, and the baseband unit 60 functioning as a satellite search component 60-1, satellite information acquisition component 60-2, positioning calculation component 60-3, and time difference evaluation component 60-4.

Time Difference Adjustment Process

Figure 6:
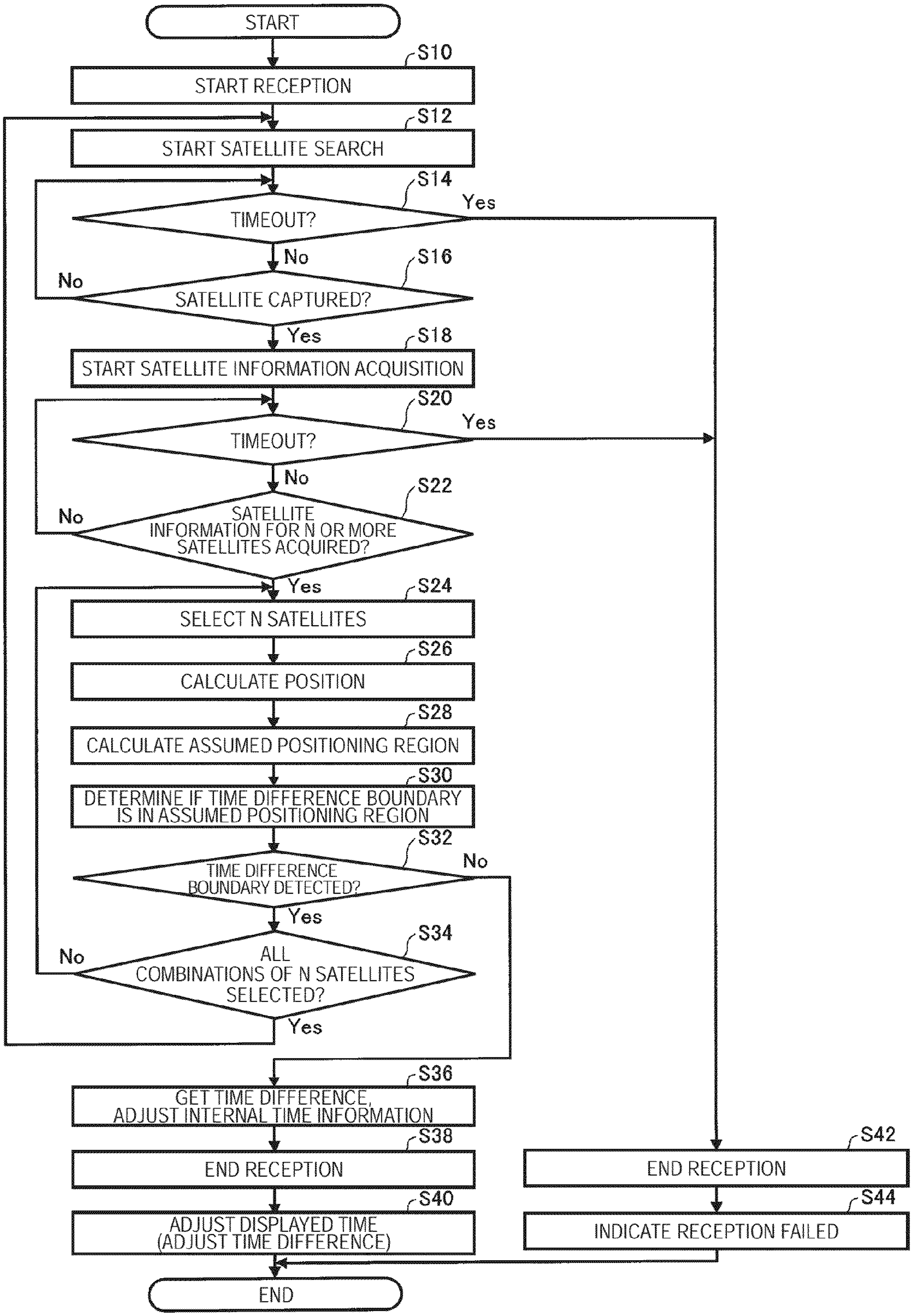
FIG. 6 is a flow chart describing an example of a time difference adjustment process according to the first embodiment of the invention.

FIG. 6 is a flow chart showing an example of the time difference adjustment process of a GPS wristwatch according to the first embodiment of the invention.

When the positioning mode is set, the GPS wristwatch 1 executes the time difference adjustment process shown in FIG. 6.

When the time difference adjustment process starts, the GPS wristwatch 1 first controls the GPS device 70 by means of the control unit 40 (reception control component 40-1) to execute the reception process. More specifically, the control unit 40 (reception control component 40-1) activates the GPS device 70, and the GPS device 70 starts receiving a satellite signal transmitted from a GPS satellite 10 (step S10).

The baseband unit 60 (satellite search component 60-1) then starts the satellite search process (satellite search step) (step S12).

More specifically, if there are, for example, thirty GPS satellites 10, the baseband unit 60 (satellite search component 60-1) generates a local code with the same pattern as the C/A code of the satellite number SV while changing the satellite number SV sequentially from 1 to 30. The baseband unit 60 (satellite search component 60-1) then calculates the correlation between the local code and the C/A code contained the baseband signal. If the C/A code contained in the baseband signal and the local code are the same, the correlation value will peak at a specific time, but if they are different codes, the correlation value will not have a peak and will always be substantially 0.

The baseband unit 60 (satellite search component 60-1) adjusts the output timing of the local code so that the correlation value of the local code and the C/A code in the baseband signal goes to the peak, and determines that the GPS satellite 10 of the satellite number SV was captured if the correlation value is greater than or equal to the set threshold value. The baseband unit 60 (satellite search component 60-1) then saves the information (such as the satellite number) of the captured GPS satellite 10 in SRAM 63, for example.

The baseband unit 60 (satellite search component 60-1) continues the satellite search process until the maximum number of capturable satellites (such as 12) is captured. Note that this maximum number of capturable satellites is the maximum number of GPS satellites 10 that can be captured at one time.

If the time-out period passes before the baseband unit 60 (satellite search component 60-1) can capture at least one GPS satellite 10 (step S14 returns Yes), the reception operation of the GPS device 70 is unconditionally aborted (step S42).

If the GPS wristwatch 1 is located in an environment where reception is not possible, such as certain indoor locations, there is no GPS satellite 10 that can be captured even after searching for all GPS satellites 10 in the constellation. By unconditionally terminating the GPS satellite 10 search when a GPS satellite 10 that can be captured cannot be detected even after the time-out period passes, the GPS wristwatch 1 can reduce wasteful power consumption. Note that the time-out period is the time limit from when reception starts until reception ends, and is set before reception starts.

If a GPS satellite 10 is captured before the time-out period passes (step S16 returns Yes), the baseband unit 60 (satellite information acquisition component 60-2) starts acquiring the satellite information (particularly the GPS time information and orbit information) from the captured GPS satellites 10 (step S18). More specifically, the baseband unit 60 (satellite information acquisition component 60-2) executes a process of demodulating the navigation messages from each captured GPS satellite and acquiring the Z count data and ephemeris data. The baseband unit 60 (satellite information acquisition component 60-2) then stores the acquired GPS time information and orbit information in SRAM 63, for example.

Note that parallel to the satellite information acquisition process the baseband unit 60 (satellite search component 60-1) continues the satellite search process described above until the maximum capturable number (such as 12) of GPS satellites 10 is captured. The baseband unit 60 (satellite information acquisition component 60-2) also sequentially acquires the satellite information from each of the captured GPS satellites 10.

If the time-out time passes before the baseband unit 60 (satellite information acquisition component 60-2) acquires satellite information from N (where N is 3 or 4, for example) or more GPS satellites 10 (step S20 returns Yes), the reception operation of the GPS device 70 ends unconditionally (step S42). The time-out time may pass without being able to correctly demodulate the satellite information for N (where N is 3 or 4, for example) or more GPS satellites 10 when, for example, the baseband unit 60 (satellite search component 60-1) cannot capture N (where N is 3 or 4, for example) or the reception level of the satellite signal from a GPS satellite 10 is low.

However, if the satellite information for N (where N is 3 or 4, for example) or more GPS satellites 10 is successfully acquired before the time-out time passes (step S22 returns Yes), the baseband unit 60 (positioning calculation component 60-3) selects the group of N (where N is 3 or 4, for example) GPS satellites 10 from among the captured GPS satellites 10 (step S24).

In order to determine the three-dimensional position (x, y, z) of the GPS wristwatch 1, three unknown values x, y, and z are needed. This means that in order to calculate the three-dimensional location (x, y, z) of the GPS wristwatch 1, GPS time information and orbit information is required for three or more GPS satellites 10. In addition, considering that the time difference between the GPS time information and the internal time information of the GPS wristwatch 1 is another unknown that is needed for even higher positioning precision, GPS time information and orbit information is needed for four or more GPS satellites 10.

The flash memory baseband unit 60 (positioning calculation component 60-3) reads the satellite information (GPS time information and orbit information) for the selected N (where N is 3 or 4, for example) GPS satellite 10 from SRAM 63, for example, and generates the positioning information (the longitude and latitude of the location where the GPS wristwatch 1 is positioned) (step S26).

As described above, the GPS time information represents the time that the GPS satellite 10 transmitted the first bit of a subframe of the navigation message. Based on the difference between the GPS time information and the internal time information when the first bit of the subframe was received, and the time correction data, the baseband unit 60 (positioning calculation component 60-3) can calculate the pseudorange between the GPS wristwatch 1 and each of the N (where N is 3 or 4, for example) GPS satellites 10. The baseband unit 60 (positioning calculation component 60-3) can also calculate the position of each of the N (where N is 3 or 4, for example) GPS satellites 10 based on the orbit information. Finally, based on the pseudorange to the GPS wristwatch 1 from each of the N (where N is 3 or 4, for example) GPS satellites 10 and the locations of the N (where N is 3 or 4, for example) GPS satellites 10, the baseband unit 60 (positioning calculation component 60-3) can generate the positioning information for the GPS wristwatch 1.

The baseband unit 60 (positioning calculation component 60-3) then calculates the positioning error (the maximum distance between the location where the GPS wristwatch 1 is positioned and the location identified by the positioning information). For example, the baseband unit 60 (positioning calculation component 60-3) multiplies the rangefinding error (the measurement error of the distance between the GPS satellite 10 and the GPS wristwatch 1) by the DOP value and uses the product as the positioning error. The PDOP value or HDOP value, for example, may be used as the DOP value.

Note that the satellite search process of the satellite search component 60-1 and the satellite information acquisition process of the satellite information acquisition component 60-2 continue parallel to the positioning calculation of the positioning calculation component 60-3. More specifically, while the positioning calculation component 60-3 is calculating the position, the satellite information acquisition component 60-2 continues searching for GPS satellites 10 until the number of currently captured GPS satellites 10 reaches the maximum number of capturable satellites, and the satellite information acquisition component 60-2 sequentially acquires the satellite information of each newly acquired GPS satellite 10. The positioning calculation component 60-3 can therefore continue calculating the position using satellite information from a newly captured GPS satellite 10 while sequentially selecting N (where N is 3 or 4, for example) GPS satellites 10 including a newly selected GPS satellite 10.

The baseband unit 60 (time difference evaluation component 60-4) then calculates the assumed positioning region (a region where the GPS wristwatch 1 is possibly located) based on the positioning information and positioning error (step S28). More specifically, the baseband unit 60 (time difference evaluation component 60-4) calculates the region inside a circle of which the position identified from the positioning information is the center and the positioning error is the radius as the assumed positioning region.

The baseband unit 60 (time difference evaluation component 60-4) then references the time difference information stored in flash memory 66, and determines if the assumed positioning region contains a time difference boundary (step S30).

If the assumed positioning region contains a time difference boundary (step S32 returns Yes), the baseband unit 60 (positioning calculation component 60-3) determines if the position was calculated using all combinations of N (where N is 3 or 4, for example) GPS satellites 10 that can be selected from among the captured GPS satellites 10 (step S34).

If the position has not been calculated using any of the possible combinations of N (where N is 3 or 4, for example) GPS satellites 10 (step S34 returns No), the GPS wristwatch 1 selects a combination of N (such as 3 or 4) GPS satellites 10 that has not been used for the positioning calculation (step S24), and repeats the positioning calculation sequence (steps S26 to S32). By thus selecting another combination of N (such as 3 or 4) GPS satellites 10 and calculating the position, it may be possible to reduce the assumed positioning region to an area not containing a time difference boundary.

If the positioning calculation has been computed using all combinations of the N (such as 3 or 4) GPS satellites 10 (step S34 returns Yes), the GPS wristwatch 1 repeats the process from the satellite search step (the sequence from step S12 to S32). Alternatively, the GPS wristwatch 1 may repeat the process from the satellite information acquisition step (the sequence from step S18 to S32).

However, if the assumed positioning region does not contain a time difference boundary (step S32 returns No), the baseband unit 60 (time difference evaluation component 60-4) references the flash memory 66 to acquire time difference data for the assumed positioning region from the time difference information, and the control unit 40 (time information adjustment component 40-2) uses this time difference data to correct the internal time information stored in the storage unit 41 (step S36).

The reception operation of the GPS device 70 then ends (step S38).

Finally, the control unit 40 (drive control component 40-3) controls the drive circuit 44 or LCD drive circuit 45 based on the corrected internal time information to adjust the displayed time (step S40).

Note that if the reception operation of the GPS device 70 is ended unconditionally (step S42), the control unit 40 (drive control component 40-3) controls the drive circuit 44 or LCD drive circuit 45 to display an indication that reception failed (step S44).

Figure 7:
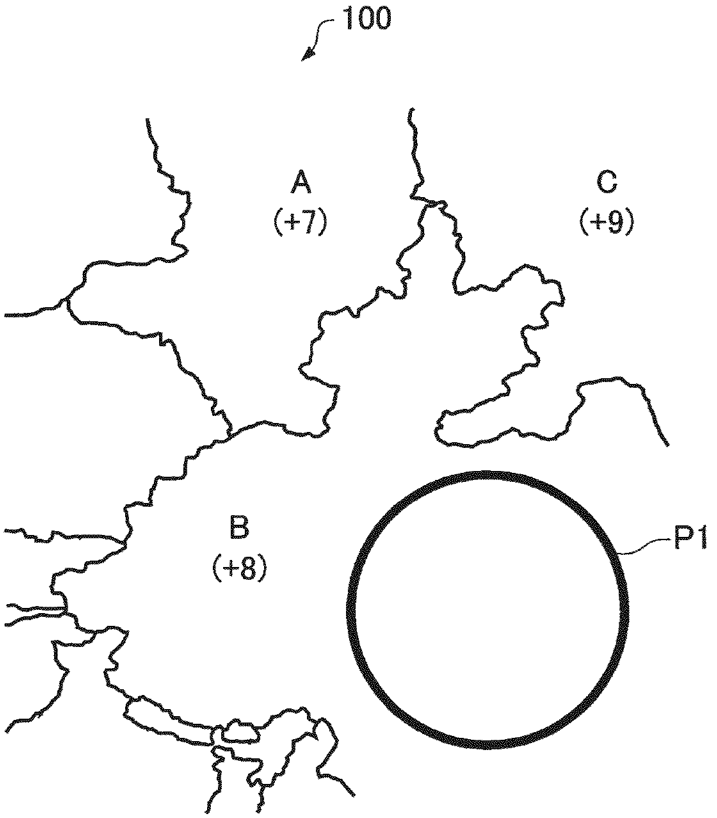
FIG. 7 describes an example of the time difference adjustment process according to the first embodiment of the invention.

FIG. 7 describes a situation in which the first calculated assumed positioning region does not contain a time difference boundary in the time difference adjustment process shown in FIG. 6.

The geographical information 100 is map information including time zones, and includes a plurality of regions A, B, and C, for example, divided by borders denoted by solid lines in the figures. More specifically, the time difference varies in adjacent regions, and the borders between the regions are the time difference boundaries. For example, regions A, B, C are time zones with a time difference to UTC of +7, +8, and +9 hours, respectively. Data describing the borders between the regions (regions A, B, C in this example) and the time difference are stored as the time difference information corresponding to the geographical information 100 in flash memory 66 in the GPS wristwatch 1 according to this embodiment of the invention. The boundary data, for example, segments each border line into numerous short straight lines, and is stored as vector data (the coordinates of both ends of each line) for each line.

The GPS wristwatch 1 according to this embodiment of the invention starts the time difference adjustment process in FIG. 6, and in step S28 the baseband unit 60 (time difference evaluation component 60-4) calculates the assumed positioning region P1 shown in FIG. 7. In step S30 the baseband unit 60 (time difference evaluation component 60-4) first reads the boundary data for the regions near the assumed positioning region P1 from flash memory 66, and determines if all of the assumed positioning region P1 is contained within region B. The baseband unit 60 (time difference evaluation component 60-4) then reads the time difference data for region B from flash memory 66, and determines that the assumed positioning region P1 does not contain a time difference boundary because only the time difference UTC+8 for region B is detected.

In step S36 the baseband unit 60 (time difference evaluation component 60-4) then acquires the time difference (UTC+8) in the assumed positioning region P1, and the control unit 40 (time information adjustment component 40-2) adjusts the internal time information. The GPS device 70 then ends reception (step S38), the time displayed on the display unit is corrected, and the time difference adjustment process ends (step S40).

Figure 8A:
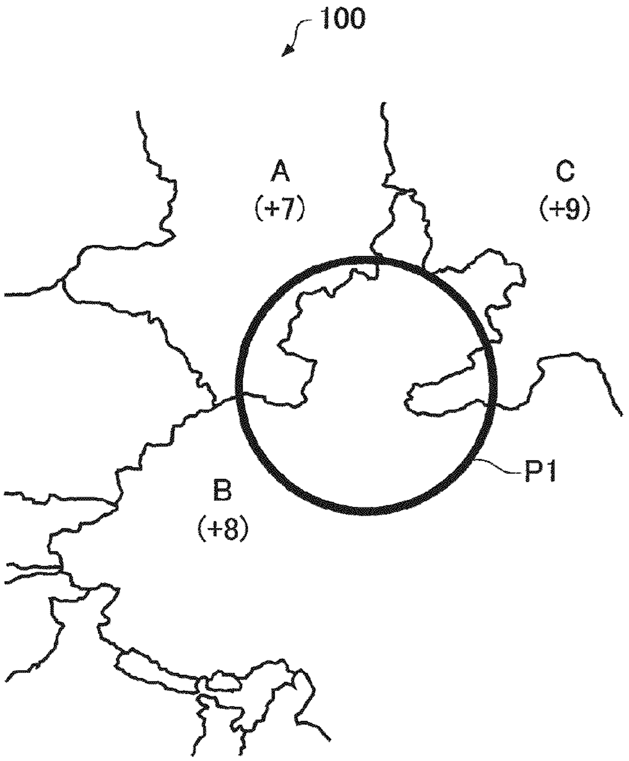
FIG. 8A and FIG. 8B describe another example of the time difference adjustment process according to the first embodiment of the invention.
Figure 8B:
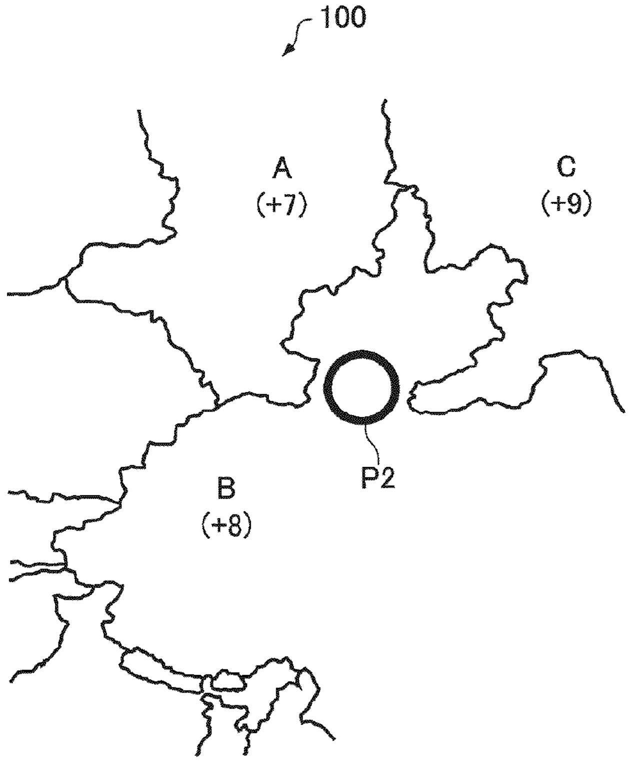

FIG. 8A and FIG. 8B describe a situation in which the first calculated assumed positioning region contains a time difference boundary in the time difference adjustment process shown in FIG. 6.

Note that the geographical information 100 is identical to the geographical information 100 shown in FIG. 7, the same reference numerals are therefore used and further description thereof is omitted.

The GPS wristwatch 1 according to this embodiment of the invention starts the time difference adjustment process in FIG. 6, and in step S28 the baseband unit 60 (time difference evaluation component 60-4) calculates the assumed positioning region P1 shown in FIG. 8A. In step S30 the baseband unit 60 (time difference evaluation component 60-4) first reads the boundary data for the regions near the assumed positioning region P1 from flash memory 66, and determines that parts of the assumed positioning region P1 are contained within regions A, B, and C. The baseband unit 60 (time difference evaluation component 60-4) then reads the time difference data for regions A, B, and C from flash memory 66, and determines that the assumed positioning region P1 contains a time difference boundary because the time differences in regions A, B, and C are different.

As a result, in step S24, the baseband unit 60 (positioning calculation component 60-3) selects a new combination of N (such as 3 or 4) GPS satellites 10 and repeats the positioning calculation, and in step S28 the baseband unit 60 (time difference evaluation component 60-4) calculates the assumed positioning region P2 shown in FIG. 8B based on the new positioning information.

In step S30 the baseband unit 60 (time difference evaluation component 60-4) then reads the time difference boundary data for the regions near the assumed positioning region P2 from flash memory 66, and because all parts of this assumed positioning region P2 are contained within region B, determines that the assumed positioning region P2 does not contain a time difference boundary.

In step S36 the baseband unit 60 (time difference evaluation component 60-4) then acquires the time difference (UTC+8) in the assumed positioning region P1, and the control unit 40 (time information adjustment component 40-2) adjusts the internal time information. The GPS device 70 then ends reception (step S38), and the time difference adjustment process ends with the time displayed on the display unit corrected (step S40).

As shown in FIG. 6, a GPS wristwatch according to a first embodiment of the invention calculates the position based on N GPS satellites 10 selected from among the captured GPS satellites 10, and calculates the assumed positioning region based on the positioning information and positioning error obtained from the positioning calculation. Time difference information stored in flash memory 66 is then referenced, and the reception process ends and the displayed time is corrected if a time difference boundary is not contained in the calculated assumed positioning region. Note that if the calculated assumed positioning region does not contain a time difference boundary, the GPS wristwatch 1 is assured of being positioned somewhere in a region with a single time difference. Therefore, if the objective is to adjust the time (adjust the time difference), the standard for deciding whether to end the reception process can be whether or not the assumed positioning region contains a time difference boundary rather than the precision of the positioning calculation.

For example, in the situation shown in FIG. 7 the assumed positioning region P1 is a fairly large region (such as the inside of a circle with a radius of several hundred kilometers), but the GPS wristwatch 1 is necessarily positioned somewhere in a region with a time difference of UTC+8. More specifically, the time difference can be corrected even if the positioning precision is quite low. Situations in which the positioning precision is low include, for example, when the rangefinding precision is low because the GPS satellite 10 time and the internal time of the GPS wristwatch 1 are offset, and when the position of the GPS satellite 10 selected for the positioning calculation is poor and the DOP value is quite high. Because the related art continues the positioning calculation until the assumed positioning region is reduced to an area small enough to not contain a time difference boundary, the time adjustment process is time consuming and is unable to adjust the time in certain situations.

However, because the assumed positioning region can be quite large as long as it contains only one time zone, the GPS wristwatch according to a first embodiment of the invention can end the positioning calculation and adjust the time depending on the position even if the precision of the positioning calculation is low and the precise position cannot be determined.

In other words, because the GPS wristwatch according to the first embodiment of the invention ends the reception process and executes the time adjustment process without further reducing the assumed positioning region when the precision of the positioning calculation is low if the assumed positioning region that is calculated does not contain a time difference boundary, power consumption can be reduced.

In the situation shown in FIG. 8A and FIG. 8B, however, the assumed positioning region P1 that is calculated first is quite large (such as the inside of a circle with a radius of several hundred kilometers), and the GPS wristwatch 1 may be located in a time zone with a time difference of UTC+7, UTC+8, or UTC+9. The GPS wristwatch 1 therefore does not adjust the time based on assumed positioning region P1. As a result, the GPS wristwatch according to the first embodiment of the invention can prevent incorrectly adjusting the time by not adjusting the time when a plurality of time zone candidates are present.

Furthermore, when the assumed positioning region that is calculated contains a time difference boundary, the GPS wristwatch according to the first embodiment of the invention repeatedly computes the positioning calculation until the assumed positioning region does not contain a time difference boundary unless the time limit is reached first, and immediately stops the reception operation and executes the time adjustment process when the assumed positioning region does not contain a time difference boundary. In other words, a GPS wristwatch according to the first embodiment of the invention can optimize the time of the high power consumption reception process and finish adjusting the time (correcting the time difference) with the lowest possible power consumption while allowing for repeating the time adjustment process as many times as required until the time limit is reached when the calculated assumed positioning region contains a time difference boundary.

Furthermore, if the time difference cannot be determined even though the time limit of the time adjustment process has passed, the GPS wristwatch according to the first embodiment of the invention ends the reception process and can therefore prevent wasteful power consumption.

2-2 Embodiment 2

As shown in FIG. 7, FIG. 8A, and FIG. 8B, each of the divided areas has a complicated shape in the foregoing first embodiment because the geographical information 100 is divided along time zone boundaries. A large amount of data is therefore needed to define the boundary lines in the first embodiment, thus requiring a large capacity storage device and possibly increasing the size of the wristwatch. Furthermore, because deciding whether or not the assumed positioning region includes a time difference boundary is complex, the decision is time consuming and power consumption can be expected to increase.

Therefore, in order to reduce the amount of time difference information (boundary line data), the geographical information 100 is divided into a plurality of regions of a constant size instead of along time zone boundaries, and the coordinates of each region and corresponding time difference data are stored as the time difference information in flash memory 66.

Note that the basic configuration of a GPS wristwatch according to this second embodiment of the invention is identical to the configuration of the GPS wristwatch according to the first embodiment of the invention, and further description thereof is omitted.

Figure 9:
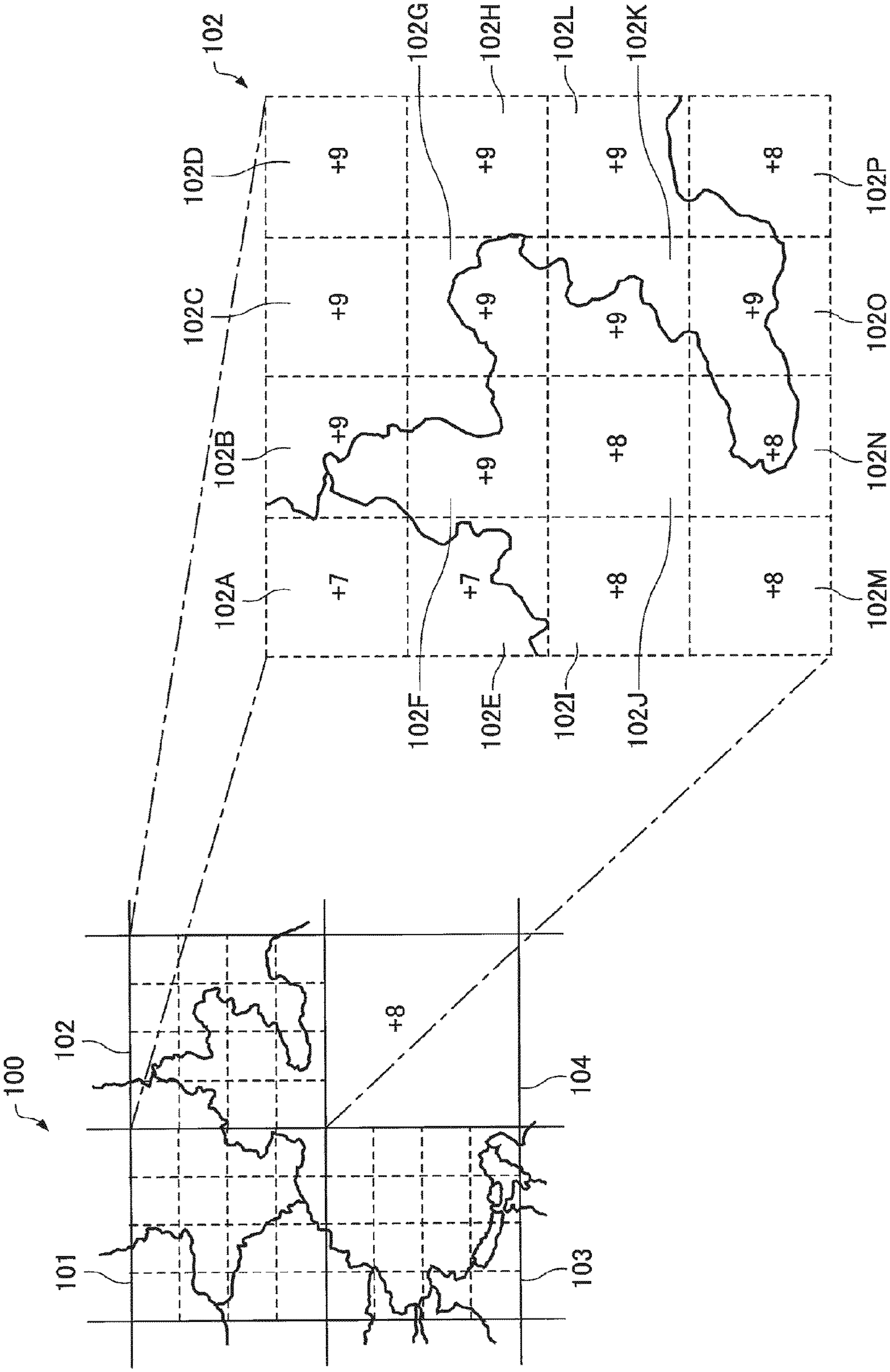
FIG. 9 shows an example of geographical information in a second embodiment of the invention.

FIG. 9 shows an example of geographical information divided into a plurality of rectangular areas.

The geographical information 100 is divided into 16 rectangular areas contained in virtual region 101, 16 rectangular areas contained in virtual region 102, 16 rectangular areas contained in virtual region 103, and rectangular area 104, and the time difference to UTC is defined for each area. These areas for which the time difference is defined are called "time difference definition areas." For example, a time difference of +8 is defined for time difference definition area 104. A time difference of +7 is defined for time difference definition areas 102A and 102E in virtual region 102, a time difference of +8 is defined for time difference definition areas 1021, 102J, 102M, 102N, and 102P, and a time difference of +9 is defined for time difference definition areas 102B, 102C, 102D, 102F, 102G, 102H, 102K, 102L, and 102O.

One time difference is thus defined for each time difference definition area. The GPS wristwatch according to the second embodiment of the invention then determines if the assumed positioning region contains a time difference boundary using the time difference definition areas as the smallest unit area as further described below. Therefore, because the precision of the time difference boundary evaluation can be improved if each time difference definition area is configured to not include an actual time difference boundary, the size of the time difference definition areas near a time difference boundary may be reduced according to the proximity to the boundary. However, when the time difference definition areas are rectangularly shaped, an actual time difference boundary may be contained no matter how small the time difference definition area. Furthermore, because the amount of time difference information increases if the number of small time difference definition areas increases and a storage device with a large storage capacity becomes necessary, the size of each time difference definition area is determined considering the tradeoff between the amount of time difference data and the precision of time difference boundary evaluation. As a result, a time difference definition area may include an actual time zone boundary.

When the time difference definition area includes an actual time difference boundary, the area of each region belonging to a different time zone in one time difference definition area may be compared and the time difference of the region that occupies the greatest area may be defined as the time difference of the time difference definition area, or if a large city is contained in one time difference definition area, the time difference of that city may be defined as the time difference of the time difference definition area. In FIG. 9, for example, time difference definition area 102E includes a region with a time difference of UTC+7 and a region with a time difference of UTC+8, but because the area occupied by the UTC+7 region is greater than the area of the UTC+8 region, a time difference of +7 is defined for this time difference definition area 102E.

Note that because virtual regions 101, 102, and 103 in FIG. 9 each contain a plurality of time difference definition areas with different defined time differences, the time difference to UTC is not defined for these virtual regions. For example, because virtual region 102 covers time difference definition areas with time differences of +7, +8, and +9, a time difference value is not defined for virtual region 102.

FIG. 10 and FIG. 11 show examples of the time difference information tables stored in flash memory 66 in a GPS wristwatch according to the second embodiment of the invention.

The region-time difference correlation table 200 shown in FIG. 10 includes position data 200-1 and time difference data 200-2 for each of the virtual regions 101, 102, and 103 and time difference definition area 104 shown in FIG. 9.

The virtual regions 101, 102, and 103 and time difference definition area 104 shown in FIG. 9 are, for example, rectangular areas approximately 1000-2000 km long in east-west and north-south directions. As a result, the position of each virtual region 101, 102, and 103 and the time difference definition area 104 can be identified using, for example, the coordinates (longitude and latitude) of the top left corner of the area and the coordinates (longitude and latitude) of the bottom right corner of the area. The coordinates for these two points are stored in flash memory 66 as the position data 200-1 in the region-time difference correlation table 200.

Because a time difference of +8 is defined for time difference definition area 104, "+8" is stored in flash memory 66 as the time difference data 200-2 of the time difference definition area 104.

Because a time difference is not defined for virtual regions 101, 102, and 103, a reference link Link1, Link2, and Link3 to another region-time difference correlation table is stored in flash memory 66 as the time difference data 200-2 for virtual regions 101, 102, and 103.

The region-time difference correlation table 202 shown in FIG. 11 contains position data 202-1 and time difference data 202-2 for the time difference definition areas 102A to 102P contained in virtual region 102 shown in FIG. 9. The region-time difference correlation table 202 can be referenced using the reference link Link2 stored as the time difference value for virtual region 102 in the region-time difference correlation table 200 shown in FIG. 10.

Because the time difference definition areas 102A to 102P are obtained by dividing the virtual region 102 into 16 parts as shown in FIG. 9 in this embodiment of the invention, the time difference definition areas 102A to 102P are rectangular areas approximately 250-500 km square, for example. As a result, these areas can also be identified using, for example, the coordinates (longitude and latitude) of the top left corner of the area and the coordinates (longitude and latitude) of the bottom right corner of the area. The coordinates for these two points are stored in flash memory 66 as the position data 202-1 in the region-time difference correlation table 202.

Furthermore, because a time difference is defined for each of the time difference definition areas 102A to 102P as shown in FIG. 9, the corresponding time difference is stored in flash memory 66 as the time difference data 202-2 for the time difference definition areas 102A to 102P.

Note that the time difference definition area 104 corresponds to a first-level area in a preferred embodiment of the invention, and time difference definition areas 102A to 102P correspond to second-level areas in a preferred embodiment of the invention. In addition, the region-time difference correlation table 200 corresponds to first-level time difference information in a preferred embodiment of the invention, and the region-time difference correlation table 202 corresponds to second-level time difference information in a preferred embodiment of the invention.

As described above there is no virtual region that includes the time difference definition area 104, but time difference definition areas 102A to 102P are contained in virtual region 102. Therefore, while the data for the time difference definition area 104 is contained in the region-time difference correlation table 200, the data for time difference definition areas 102A to 102P is contained in a different region-time difference correlation table 202 that is referenced from region-time difference correlation table 200 using the reference link Link2. The time difference definition areas can therefore be thought of as being separated into levels by virtual regions. More specifically, the time difference definition area 104 corresponds to a first-level area in a preferred embodiment of the invention, and the time difference definition areas 102A to 102P correspond to second-level areas in a preferred embodiment of the invention. Furthermore, the region-time difference correlation table 200 corresponds to first-level time difference information in a preferred embodiment of the invention, and the region-time difference correlation table 202 corresponds to second-level time difference information in a preferred embodiment of the invention.

One virtual region may also contain another virtual region. For example, if a virtual region including time difference definition areas 102A, 102B, 102E, and 102F is defined, virtual region 102 will include another virtual region. In this situation time difference definition areas 102A, 102B, 102E, and 102F correspond to a third-level area, and the region-time difference correlation table containing the position data and time difference data for time difference definition areas 102A, 102B, 102E, and 102F corresponds to third-level time difference information in a preferred embodiment of the invention. The time difference definition areas can thus be divided into first-level to N-level areas, and time difference information including first-level to N-level region-time difference correlation tables may be stored in flash memory 66.

Figure 12:
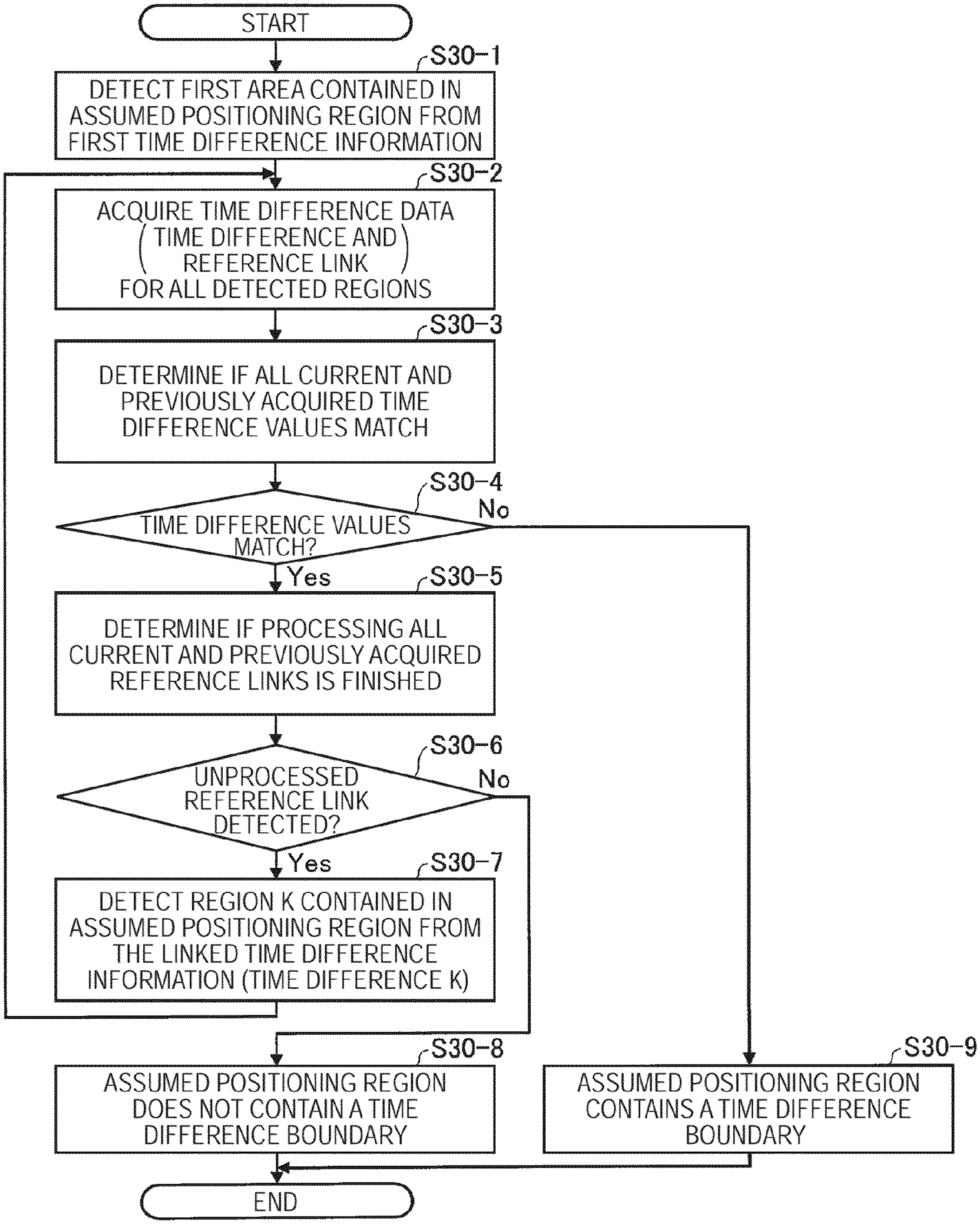
FIG. 12 is a flow chart describing a process for determining if the assumed positioning region includes a time difference boundary in the second embodiment of the invention.

FIG. 12 is a flow chart of the process determining if the assumed positioning region contains a time difference boundary in a GPS wristwatch according to the second embodiment of the invention. Note, further, that the process shown in FIG. 12 describes the specific operations executed in step S30 in the time difference adjustment process shown in FIG. 6.

The baseband unit 60 (time difference evaluation component 60-4) first detects any virtual regions and time difference definition areas (first areas) contained in the assumed positioning region from the first-level time difference information (first time difference information) (step S30-1). More specifically, the baseband unit 60 (time difference evaluation component 60-4) references the position data (coordinate data) in the first time difference information and identifies the position of the first area, and then detects a first area of which at least part is contained in the area inside a circle corresponding to the assumed positioning region.

Next, the baseband unit 60 (time difference evaluation component 60-4) acquires the time difference data (time difference values and reference links) of all detected first areas (step S30-2).

Next, the baseband unit 60 (time difference evaluation component 60-4) then determines if the currently or previously acquired time difference values for all time difference definition areas match or not (step S30-3).

If at least a part of the current or previously acquired time difference values do not match (step S30-4 returns No), the baseband unit 60 (time difference evaluation component 60-4) determines that the assumed positioning region includes a time difference boundary (step S30-9).

However, if the time difference values for all of the current or previously acquired time difference definition areas match (step S30-4 returns Yes), the baseband unit 60 (time difference evaluation component 60-4) determines if processing the reference links for all of the currently or previously acquired virtual regions has been completed (step S30-5).

If there are any unprocessed links (step S30-6 returns Yes), the baseband unit 60 (time difference evaluation component 60-4) detects the k-th area contained in the assumed positioning region from the time difference information (k-th time difference information) retrieved by the reference link (step S30-7). The baseband unit 60 (time difference evaluation component 60-4) then repeats steps S30-2 to S30-7 until there are no unprocessed reference links remaining or at least part of all currently or previously acquired time difference values do not match.

If there are no unprocessed reference links (step S30-6 returns No), the baseband unit 60 (time difference evaluation component 60-4) determines that the assumed positioning region does not contain a time difference boundary (step S30-8).

Figure 13:
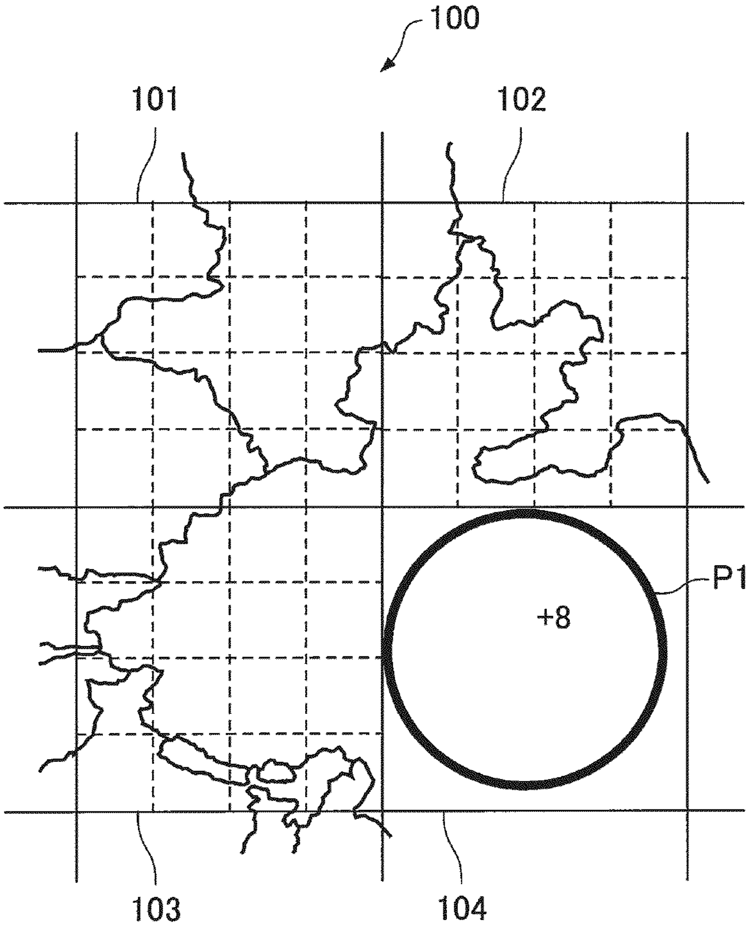
FIG. 13 describes an example of a process for acquiring the time difference in the assumed positioning region in the second embodiment of the invention.

FIG. 13 describes a situation in which the calculated assumed positioning region does not contain a time difference boundary in the process shown in FIG. 12. Note that in the situation shown in FIG. 13 the data shown in the region-time difference correlation tables in FIG. 10 and FIG. 11 is stored in flash memory 66, and the same assumed positioning region as in the situation described in FIG. 7 is calculated.

The assumed positioning region P1 shown in FIG. 13 is determined to include only the time difference definition area 104 as a first area based on the position data of the region-time difference correlation table 200 shown in FIG. 10. The time difference for time difference definition area 104 in the region-time difference correlation table 200 shown in FIG. 10 is +8. The assumed positioning region P1 is therefore determined to not contain a time difference boundary, and +8 is acquired as the time difference in the assumed positioning region P1.

Figure 14A:
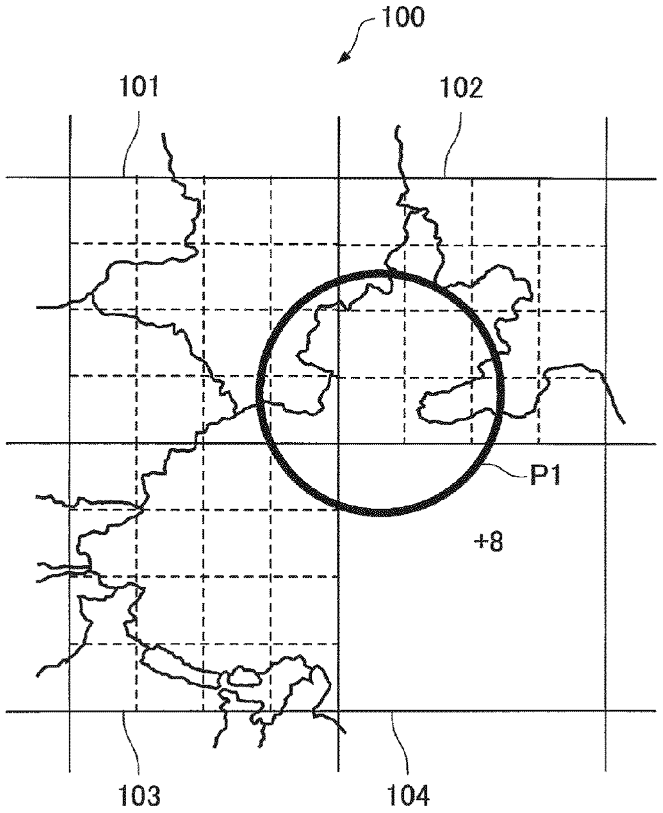
FIG. 14A and FIG. 14B describe other examples of a process for acquiring the time difference in the assumed positioning region in the second embodiment of the invention.
Figure 14B:
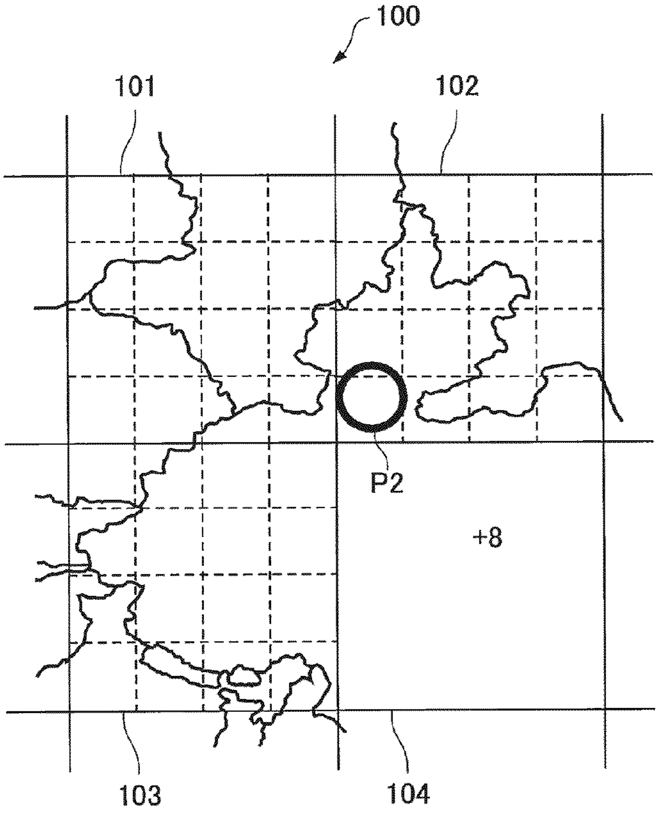

FIG. 14A and FIG. 14B describe a situation in the process shown in FIG. 12 in which the calculated assumed positioning region includes a time difference boundary. Note that in the situation shown in FIG. 14A and FIG. 14B the data shown in the region-time difference correlation tables in FIG. 10 and FIG. 11 is stored in flash memory 66, and the same assumed positioning regions as in the situation described in FIG. 8A and FIG. 8B are calculated.

The assumed positioning region P1 shown in FIG. 14A is determined to contain virtual regions 101, 102, and 103 and time difference definition area 104 as first areas based on the position data in the region-time difference correlation table 200 shown in FIG. 10. The time difference values for virtual regions 101, 102, and 103 in region-time difference correlation table 200 are the reference links Link1, Link2, and Link3, and the time difference in time difference definition area 104 is +8.

Based on the position data for the region-time difference correlation table 202 shown in FIG. 11 referenced by Link2, the assumed positioning region P1 is determined to include time difference definition areas 102E, 102F, 1021, 102J, 102K, 102M, 102N, and 102O. The time difference values for the time difference definition areas 102E, 102F, 1021, 102J, 102K, 102M, 102N, and 102O in the region-time difference correlation table 202 are, respectively, +7, +9, +8, +8, +9, +8, +8, and +9. The assumed positioning region P1 is therefore determined to include a time difference boundary. The assumed positioning region P2 shown in FIG. 14B is therefore calculated next.

The assumed positioning region P2 shown in FIG. 14B is determined to include only the virtual region 102 as a first area based on the position data in the region-time difference correlation table 200 shown in FIG. 10. The time difference value for the virtual region 102 in the region-time difference correlation table 200 shown in FIG. 10 is Link2.

Based on the position data in the region-time difference correlation table 202 shown in FIG. 11 referenced by Link2, the P1 is determined to contain time difference definition areas 1021, 102M, and 102N as second areas. The time difference is +8 for each of the time difference definition areas 102I, 102M, and 102N in region-time difference correlation table 202. The assumed positioning region P2 is therefore determined to not include a time difference boundary, and +8 is acquired as the time difference in assumed positioning region P2.

In addition to the effects of the GPS wristwatch according to the first embodiment of the invention, the GPS wristwatch according to the second embodiment of the invention has the following effect.

The GPS wristwatch according to the second embodiment of the invention determines if the assumed positioning region that is calculated covers all or part of a virtual region, and if it does references the position of the time difference definition areas inside that virtual region to determine if there is a time difference boundary therein. Therefore, if a region containing a dense grouping of multiple small time zones is defined as the virtual region, and the calculated assumed positioning region does not contain the virtual region, it is not necessary to separately determine if the assumed positioning region contains all or a part of these multiple small time zone regions. A GPS wristwatch according to the second embodiment of the invention can therefore optimize the time of the evaluation process that determines if the assumed positioning region contains a time difference boundary.

Furthermore, because the GPS wristwatch according to the second embodiment of the invention determines whether or not the assumed positioning region contains a time difference boundary based on the locations of the multiple time difference definition areas contained in the virtual region when the assumed positioning region that is calculated contains a virtual region, high evaluation precision can be assured.

The GPS wristwatch according to the second embodiment of the invention first references first-level time difference information and determines whether or not the assumed positioning region contains part or all of a first-level virtual region. If the assumed positioning region contains part or all of a first-level virtual region, second-level time difference information is referenced and whether or not the assumed positioning region contains part or all of a second-level virtual region is determined. Likewise, if the assumed positioning region contains part or all of a k-level virtual region, k+1 level time difference information is referenced and whether or not the assumed positioning region contains part or all of a k+1 level virtual region is determined. If the assumed positioning region does not contain part or all of a k-level virtual region, whether or not the assumed positioning region contains a time difference boundary is determined based on the location of the k-level time difference definition area.

In other words, because the GPS wristwatch according to the second embodiment of the invention executes the evaluation process while sequentially referencing time difference information organized suitably hierarchically according to the size of the region for which a time difference is defined, how much time is consumed by the evaluation process can be optimized.

Furthermore, because the shape of the time difference definition areas and virtual regions is rectangular, the GPS wristwatch according to the second embodiment of the invention only needs to store coordinate data for the two end points of the diagonals of the rectangles in order to determine the area. As a result, this aspect of the invention can greatly reduce the amount of time difference information that must be stored compared with a configuration that stores data for each of numerous short lines used to define a time difference boundary.

Yet further, if the size of the rectangular shapes of the time difference definition areas and virtual regions contained in the time difference information for each level is fixed, the GPS wristwatch according to the second embodiment of the invention needs to store the coordinates of only one point for each area or region, and can thus further reduce the amount of time difference data.

In addition, because the time difference definition areas and virtual regions are rectangular, the GPS wristwatch according to the second embodiment of the invention can very easily determine if the calculated assumed positioning region contains a time difference boundary.

2-3 Embodiment 3

Figure 15:
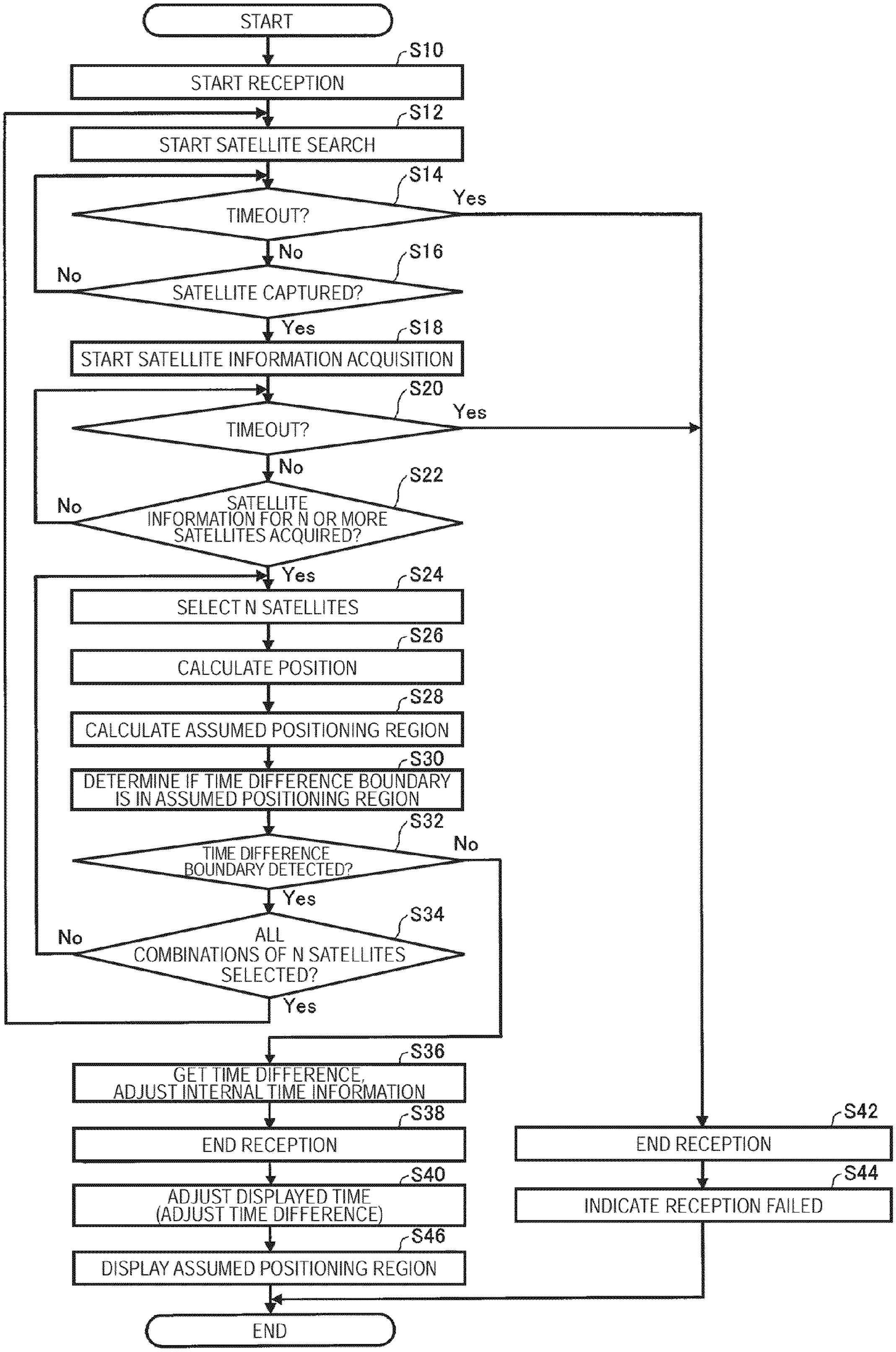
FIG. 15 is a flow chart showing an example of the time difference adjustment process in a third embodiment of the invention.

FIG. 15 is a flow chart of a time difference adjustment process in a GPS wristwatch according to the third embodiment of the invention.

The time difference adjustment process shown in FIG. 15 is basically the same as the time difference adjustment process shown in FIG. 6. More specifically, steps S10 to S44 in the time difference adjustment process shown in FIG. 15 are identical to steps S10 to S44 in the time difference adjustment process shown in FIG. 6, are therefore identified by the same reference numerals, and further description thereof is omitted.

The time difference adjustment process shown in FIG. 15 adds a step of displaying the assumed positioning region (the process in step S46) to the time difference adjustment process shown in FIG. 6. Note that this step of displaying the assumed positioning region (the process in step S46) may be executed before the step of adjusting the displayed time (the process of step S40).

Figure 16:
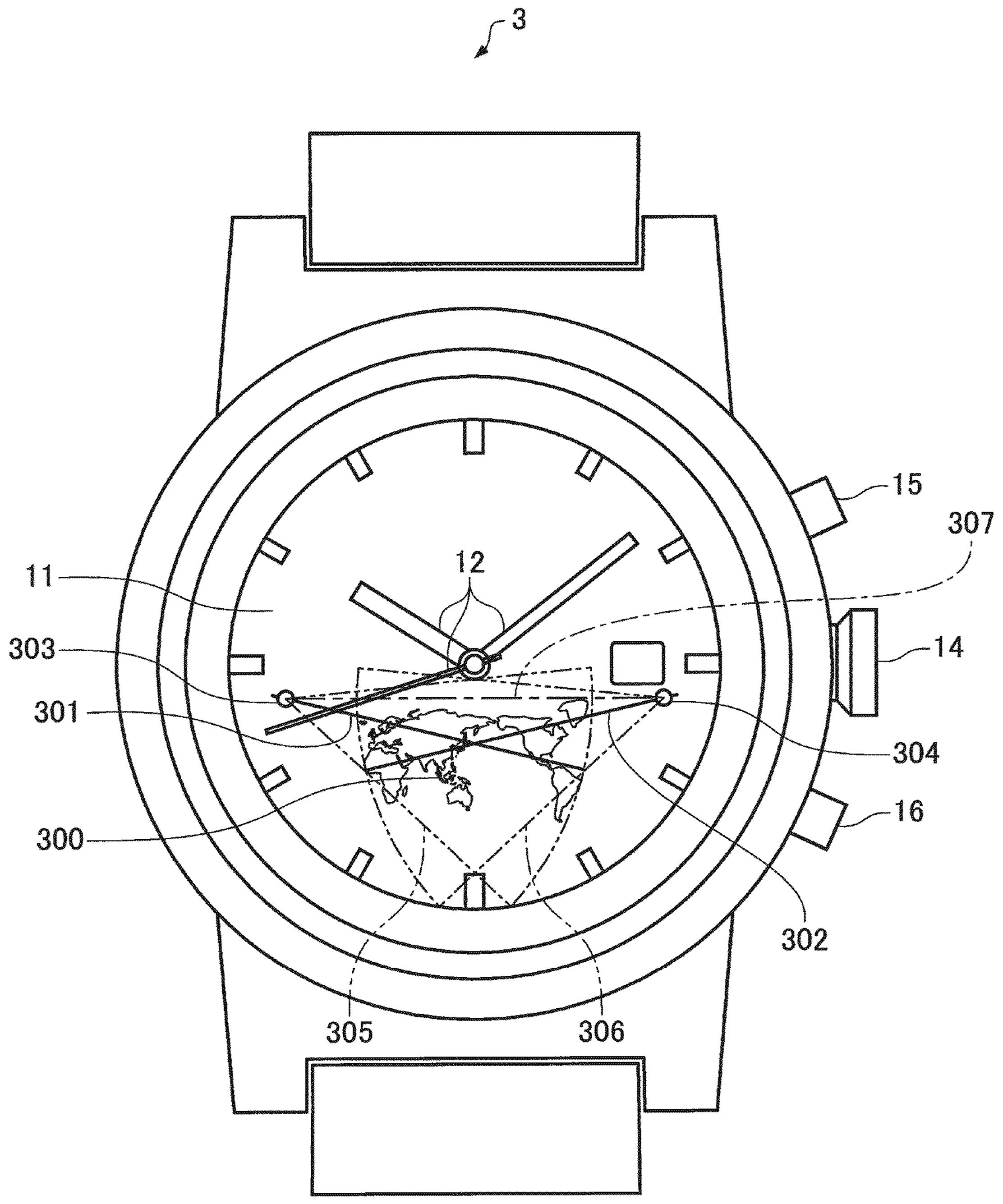
FIG. 16 shows the face of a GPS wristwatch according to the third embodiment of the invention.

FIG. 16 describes an example of displaying the assumed positioning region in step S46 in the time difference adjustment process shown in FIG. 15, and schematically describes the face of a GPS wristwatch according to the third embodiment of the invention.

Note that the basic configuration of a GPS wristwatch according to this second embodiment of the invention is identical to the configuration of the GPS wristwatch according to the first embodiment of the invention, and further description thereof is omitted.

A map 300 is formed on the surface of the GPS wristwatch 3, and rotating hands 301 and 302 are disposed along along the top edge of the map 300. The map 300 is a world map, and the current location is displayed by the hands 301 and 302 anywhere in the world the GPS wristwatch 3 is located. The world map may be rendered using any existing mapping method, is not limited to a Japan-centric world map, and may be rendered using other projection methods.

The map 300 is formed at a fixed position by engraving, printing, or other suitable means on the surface of the dial 11. The dial 11 may be made using a transparent material, and a pattern of the map may be engraved or printed facing the back. Alternatively, the map 300 may be printed on film, and this film may be affixed to the back of a transparent dial 11. In other words, the dial 11 or display face can be rendered in any way enabling the map 300 to be viewed normally from the front.

The hands 301 and 302 have rotary shafts 303 and 304, and can move rotationally on these shafts over the surface of the dial 11. Driving the hands 301 and 302 is controlled by the control unit 40 (drive control component 40-3) through the drive circuit 44.

The paths 305 and 306 traced by the hands 301 and 302 when the hands rotate are indicated by the double-dot lines in the figure. The map 300 is formed to be contained inside the area covered by the paths 305 and 306 of the hands 301 and 302. The two hands 301 and 302 can intersect at any desired point within this area. A specific point on the map 300 can thus be indicated by the intersection of the two hands 301 and 302.

The rotary shafts 303 and 304 are disposed on opposite sides of the map 300 with the top edge part of the map 300 therebetween. A line joining the centers of the rotary shafts 303 and 304 is an escape line 307. The escape line 307 is denoted by a dot-dash line and is located outside the top edge of the map 300. More precisely, part of the map 300 image is above the escape line 307, but parts that are not used to indicate the current position by the hands 301 and 302 are allowed to be outside the escape line 307.

The hands 301 and 302 can be removed to a position off the map 300 when they are positioned on the escape line 307, that is, when the distal end of each points to the other rotary shaft 303, 304.

When the positioning mode is set and the time difference adjustment process ends, the control unit 40 (drive control component 40-3) controls driving the hands 301 and 302 so that the position on the map 300 corresponding to the positioning information is indicated by the intersection of the hands 301 and 302. Because the GPS wristwatch 3 thus displays the positioning information by means of the intersection of the hands 301 and 302 instead of using a digital display, high precision positioning information is not required. More specifically, the GPS wristwatch 3 in this embodiment of the invention can indicate the approximate position even when a relatively large assumed positioning region is calculated by the time difference adjustment process. Note that when a particularly large assumed positioning region (such as an area with a radius of several hundred kilometers) is calculated, the hands 301 and 302 may be caused to oscillate over the area of the assumed positioning region as a way of indicating the size of the assumed positioning region.

In addition to the effects of the GPS wristwatch according to the first embodiment of the invention, the GPS wristwatch according to the third embodiment of the invention has the following effects.

The GPS wristwatch according to the third embodiment of the invention can clearly indicate a single point on the map 300 using the intersection of two hands 301 and 302. Because the intersecting hands 301 and 302 extend to the periphery, the intersection of the hands can easily track the current position and the hands are suitable to sensorially determining the current position.

In addition, by rendering a map 300 on the dial 11 or display surface, the GPS wristwatch according to the third embodiment of the invention does not need to use a liquid crystal display panel, for example, and can maintain a desirable appearance for a wristwatch 1.

2-4 Embodiment 4

Figure 17:
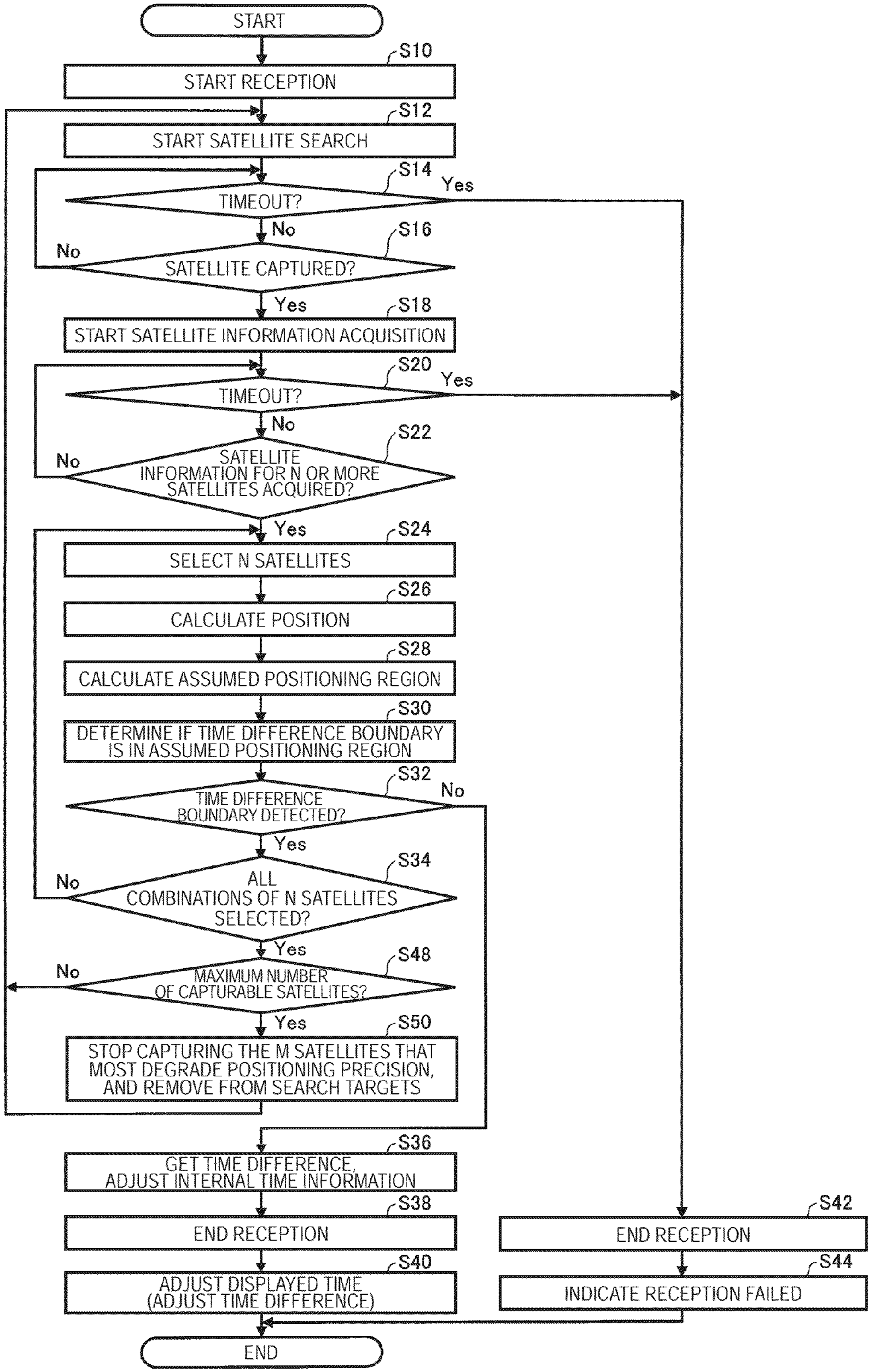
FIG. 17 is a flow chart describing an example of the time difference adjustment process in a fourth embodiment of the invention.

FIG. 17 is a flow chart of a time difference adjustment process in a GPS wristwatch according to the fourth embodiment of the invention. Note that the basic configuration of a GPS wristwatch according to this fourth embodiment of the invention is identical to the configuration of the GPS wristwatch according to the first embodiment of the invention, and further description thereof is omitted.

The time difference adjustment process shown in FIG. 17 is basically the same as the time difference adjustment process shown in FIG. 6. More specifically, steps S10 to S44 in the time difference adjustment process shown in FIG. 17 are identical to steps S10 to S44 in the time difference adjustment process shown in FIG. 6, are therefore identified by the same reference numerals, and further description thereof is omitted.

The time difference adjustment process shown in FIG. 16 differs from the time difference adjustment process shown in FIG. 6 in that when the assumed positioning regions calculated from all combinations of the N (such as 3 or 4) GPS satellites 10 contain a time difference boundary (when step S32 returns Yes), the satellite search process repeats. In addition, before starting the satellite search step the baseband unit 60 (satellite search component 60-1) determines if the number of currently captured GPS satellites 10 has reached the maximum number of capturable satellites (such as 12) (step S48).

If the number of captured GPS satellites 10 equals the maximum number of capturable satellites (such as 12) (step S48 returns Yes), the baseband unit 60 (satellite search component 60-1) stops the capture of the M (such as 1) GPS satellites 10 that are the cause of the greatest degradation of positioning precision, and removes those satellites from the group of searched satellites (step S50). Because the baseband unit 60 (positioning calculation component 60-3) has calculated the position using all combinations of N (such as 3 or 4) GPS satellites 10, the baseband unit 60 (satellite search component 60-1) knows which GPS satellites 10 are included when the positioning precision drops.

The GPS wristwatch 1 then repeats the satellite search and following steps (steps S12 to S34). Because this enables calculating the position by selecting a newly captured GPS satellite 10 instead of the GPS satellite 10 that degrades the positioning precision, it may be possible to reduce the assumed positioning region to a size not including a time difference boundary.

However, if the maximum capturable number (such as 12) of GPS satellites 10 has not been captured (step S48 returns No), the GPS wristwatch 1 repeats the satellite search and following steps (steps S12 to S34).

Note that when the assumed positioning region contains a time difference boundary (step S32 returns Yes) in the time difference adjustment process shown in FIG. 17, and all combinations of the N GPS satellites 10 have been selected from among the captured GPS satellites 10 and used for the positioning calculation (step S34 returns Yes), the satellite search step repeats.

In addition to the effects of the GPS wristwatch according to the first embodiment of the invention, the GPS wristwatch according to the fourth embodiment of the invention has the following effects.

If the assumed positioning region contains a time difference boundary regardless of which combination of N GPS satellites 10 is selected from the captured GPS satellites 10, the GPS wristwatch according to the fourth embodiment of the invention captures a new GPS satellite 10 and uses the satellite information from that satellite for the positioning calculation. In addition, if the number of currently captured GPS satellites 10 equals the maximum number of capturable satellites, the positioning calculation is done using the satellite information from a newly captured GPS satellite 10 instead of the M (such as 1) GPS satellites 10 that most degrade the positioning precision. Because the positioning precision can thus be improved, calculating a small assumed positioning region that does not contain a time difference boundary is easy. Therefore, the GPS wristwatch according to the fourth embodiment of the invention can easily determine the time difference even when in a location that is relatively near a time difference boundary, optimize the power consumption required by the positioning calculation, and complete the time adjustment process (time difference adjustment process) while consuming as little power as possible.

2-5 Embodiment 5

Figure 18:
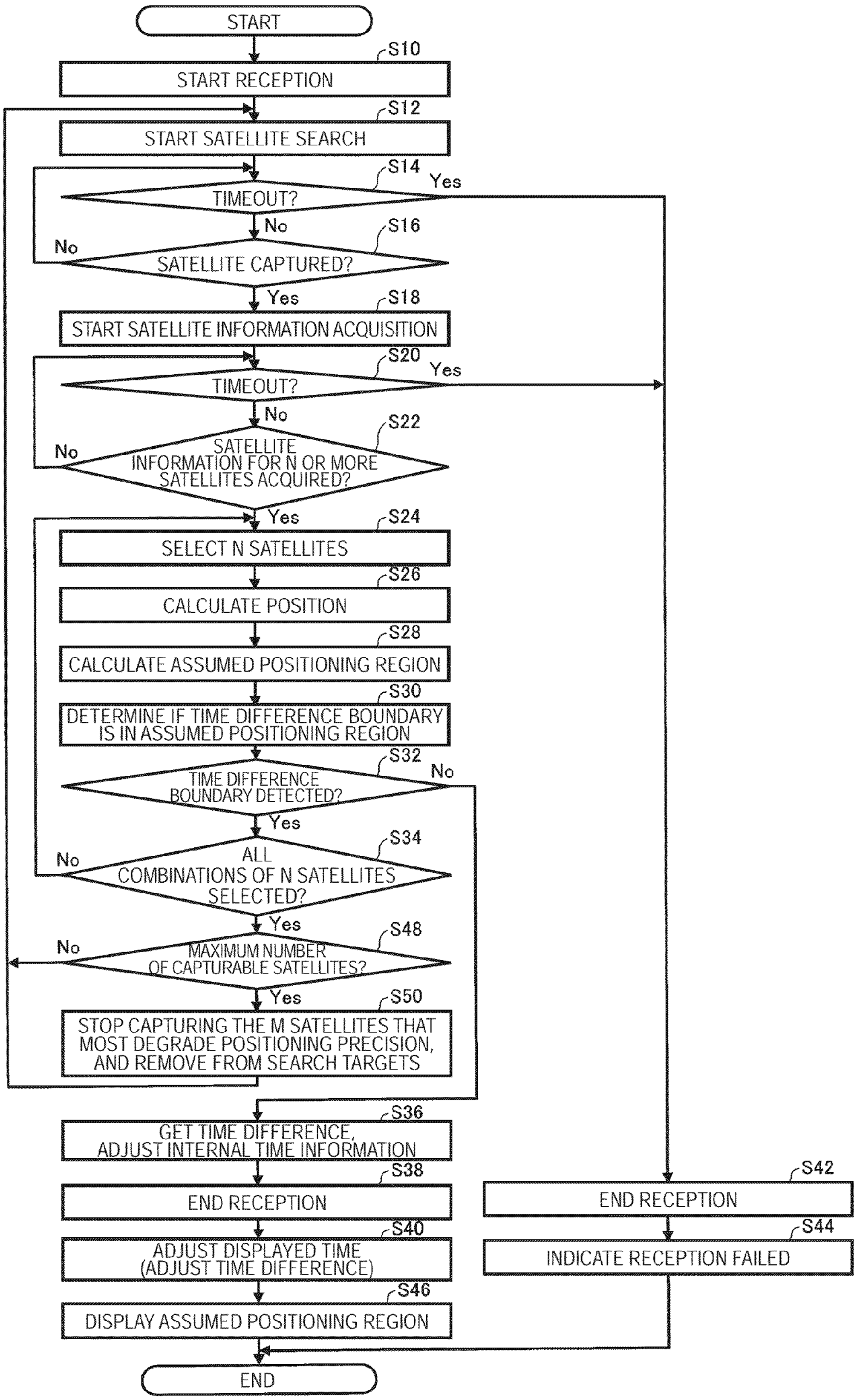
FIG. 18 is a flow chart describing an example of the time difference adjustment process in a fifth embodiment of the invention.

FIG. 18 is a flow chart of a time difference adjustment process in a GPS wristwatch according to a fifth embodiment of the invention.

The time difference adjustment process shown in FIG. 18 is basically the same as the time difference adjustment process shown in FIG. 17. More specifically, steps S10 to S44 in the time difference adjustment process shown in FIG. 18 are identical to steps S10 to S44 in the time difference adjustment process shown in FIG. 17, are therefore identified by the same reference numerals, and further description thereof is omitted.

The time difference adjustment process shown in FIG. 18 adds a step of displaying the assumed positioning region (the process in step S46) to the time difference adjustment process shown in FIG. 17. Note that this step of displaying the assumed positioning region (the process in step S46) may be executed before the step of adjusting the displayed time (the process of step S40).

The assumed positioning region can be displayed in step S46 in the time difference adjustment process shown in FIG. 18 using the GPS wristwatch shown in FIG. 16, for example.

In addition to the effects of the GPS wristwatch according to the fourth embodiment of the invention, the GPS wristwatch according to the fifth embodiment of the invention has the following effects.

The GPS wristwatch according to the fifth embodiment of the invention can clearly indicate a single point on the map 300 using the intersection of two hands 301 and 302. Because the intersecting hands 301 and 302 extend to the periphery, the intersection of the hands can easily track the current position and the hands are suitable to sensorially determining the current position.

In addition, by rendering a map 300 on the dial 11 or display surface, the GPS wristwatch according to the fifth embodiment of the invention does not need to use a liquid crystal display panel, for example, and can maintain a desirable appearance for a wristwatch 1.

It will be obvious to one with ordinary skill in the related art that the invention is not limited to the embodiments described above and can be varied in many ways without departing from the scope of the accompanying claims.

The invention includes configurations that are effectively the same as the configurations of the preferred embodiments described above, including configurations with the same function, method, and effect, and configurations with the same object and effect. The invention also includes configurations that replace parts that are not fundamental to the configurations of the preferred embodiments described above. The invention also includes configurations achieving the same operational effect as the configurations of the preferred embodiments described above, as well as configurations that can achieve the same object. The invention also includes configurations that add technology known from the literature to the configurations of the preferred embodiments described above.

Preferred embodiments of the invention are described in detail above, and, based on this disclosure, one skilled in the related art will recognize that many variations that do not actually depart from the novel innovations and effects of the invention are possible. Such variations are included in the scope of the present invention to the extent embodied in any claims.

What is claimed is:

1. An electronic timepiece having a function for receiving satellite signals transmitted from positioning information satellites, comprising:

a reception unit that receives the satellite signal and acquires satellite information from the received satellite signal;

a satellite search unit that executes a process of searching for a capturable positioning information satellite based on the received satellite signal and capturing the found satellite signal;

a positioning calculation unit that selects a specific number of positioning information satellites from among the positioning information satellites captured by the satellite search unit, executes a positioning calculation based on the satellite information contained in the satellite signals sent from the selected positioning information satellites, and generates positioning information;

a time information adjustment unit that corrects internal time information based on the satellite information;

a time information display unit that displays the internal time information;

a storage unit that stores time difference information defining the time difference in each of a plurality of areas into which geographical information is divided; and a time difference evaluation unit that calculates an assumed positioning region based on the positioning information, and determines based on the time difference information if the assumed positioning region contains a time difference boundary;

the time information adjustment unit correcting the internal time information based on the time difference in the assumed positioning region when the time difference evaluation unit determines that the assumed positioning region does not contain a time difference boundary, the positioning calculation unit selecting the specific number of positioning information satellites again and continuing the positioning calculation when the time difference evaluation unit determines that the assumed positioning region contains a time difference boundary, and the reception unit terminating satellite signal reception when the time difference evaluation unit determines that the assumed positioning region does not contain a time difference boundary.

2. The electronic timepiece described in claim 1, wherein: the satellite search unit continues a process searching for new capturable positioning information satellites until positioning information satellites equal to a maximum number of capturable satellites are captured, and executes a process of stopping the capture of at least one positioning information satellite and searching for a new capturable positioning information satellite when the maximum capturable number of positioning information satellites is captured and the time difference evaluation unit determines the assumed positioning region contains a time difference boundary.

3. The electronic timepiece described in claim 1, wherein: the reception unit ends satellite signal reception when the time difference evaluation unit does not determine that the assumed positioning region does not contain a time difference boundary before a specified time limit passes.

4. The electronic timepiece described in claim 1, wherein: the positioning calculation unit calculates the positioning information error based on a DOP value; and the time difference evaluation unit calculates the assumed positioning region based on said error.

5. The electronic timepiece described in claim 1, further comprising:

a positioning information display unit that displays the positioning information, and updates the displayed positioning information when the time difference evaluation unit determines that the assumed positioning region does not contain a time difference boundary.

6. The electronic timepiece described in claim 1, wherein: the time difference information includes information identifying the position of a virtual region containing a plurality of areas defined with different time differences selected from the plurality of areas into which the geographical information is divided; and the time difference evaluation unit determines based on the time difference information if the assumed positioning region contains at least a part of the virtual region, and determines whether or not the assumed positioning region contains a time difference boundary based on the position of the area contained in the virtual region when the assumed positioning region contains the virtual region.

7. The electronic timepiece described in claim 6, wherein: the areas are grouped into first-level to N-level (where $N \geq 2$) areas;

the time difference information includes first-level to N-level time difference information defining the time difference in each of the first-level to N-level areas;

the virtual region in the k-level (where $1 \leq k < N$) time difference information includes areas of levels k+1 and less; and the time difference evaluation unit determines based on the k level time difference information whether or not the assumed positioning region contains at least a part of the virtual region, and when the assumed positioning region contains at least a part of the virtual region, determines based on the k+1 level time difference information whether or not the assumed positioning region contains at least a part of the virtual region.

8. The electronic timepiece described in claim 6, wherein: the areas and the virtual region are drawn with a rectangular shape.

9. A time difference adjustment method for an electronic timepiece including a reception unit that receives satellite signals transmitted from positioning information satellites and acquires satellite information from the received satellite signal, a time information display unit that displays internal time information, and a storage unit that stores time difference information defining the time difference in each of a plurality of areas into which geographical information is divided, the time difference adjustment method comprising:

acquiring the satellite information by means of the reception unit;

searching for a capturable positioning information satellite based on the received satellite signal and capturing the found satellite signal;

selecting a specific number of positioning information satellites from among the positioning information satellites captured by the satellite search step, executing a positioning calculation based on the satellite information contained in the satellite signals sent from the selected positioning information satellites, and generating positioning information;

calculating an assumed positioning region based on the positioning information;

determining based on the time difference information if the assumed positioning region contains a time difference boundary; and correcting the internal time information based on the time difference in the assumed positioning region and terminating satellite signal reception by the reception unit when the assumed positioning region is determined to not include a time difference boundary;

selecting the specific number of positioning information satellites and continuing the positioning calculation when the assumed positioning region is determined to contain a time difference boundary.

* * * * *